United States Patent
Chang et al.

(10) Patent No.: US 6,226,111 B1
(45) Date of Patent: May 1, 2001

(54) INTER-RING CROSS-CONNECT FOR SURVIVABLE MULTI-WAVELENGTH OPTICAL COMMUNICATION NETWORKS

(75) Inventors: Gee-Kung Chang, Holmdel, NJ (US); Georgios Ellinas, New York, NY (US); John K. Gamelin, Red Bank, NJ (US); Muhammed Zafar Iqbal, Sylhet; Mamun R. Rashid Khandker, Rajshahi, both of (BD)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 08/985,159

(22) Filed: Dec. 4, 1997

Related U.S. Application Data
(60) Provisional application No. 60/032,120, filed on Dec. 6, 1996.

(51) Int. Cl.[7] .................................................. H04J 14/00
(52) U.S. Cl. ........................ 359/119; 359/110; 359/128; 370/223
(58) Field of Search ................................. 359/119, 110, 359/128, 117; 385/17; 370/222–223

(56) References Cited

U.S. PATENT DOCUMENTS

| | | | |
|---|---|---|---|
| 5,093,824 | 3/1992 | Coan et al. ............................. | 370/16 |
| 5,179,548 | 1/1993 | Sandesara ........................... | 370/16.1 |
| 5,327,427 | 7/1994 | Sandesara ........................... | 370/85.14 |
| 5,495,472 | 2/1996 | Ohara .................................... | 370/16.1 |
| 5,515,367 | 5/1996 | Cox et al. ............................. | 360/16.1 |
| 5,550,805 | 8/1996 | Takatori et al. ..................... | 370/16.1 |
| 5,550,818 | 8/1996 | Brackett ................................. | 370/60 |
| 5,623,482 | 4/1997 | Okanoue ................................ | 370/224 |
| 5,647,035 | 7/1997 | Cadeddu et al. ........................ | 385/24 |
| 5,657,320 | 8/1997 | Russ et al. ............................. | 370/217 |
| 5,680,326 | 10/1997 | Russ et al. ........................ | 364/514 R |
| 5,712,942 | 1/1998 | Jennings et al. ..................... | 385/134 |
| 5,717,796 | * 2/1998 | Clendening .......................... | 359/119 |
| 5,745,476 | * 4/1998 | Chaudhuri ............................ | 370/222 |
| 5,933,258 | * 8/1999 | Flanagan et al. ..................... | 359/110 |
| 6,023,359 | * 2/2000 | Asahi ................................... | 359/119 |

FOREIGN PATENT DOCUMENTS
| | | | | |
|---|---|---|---|---|
| 0716521 | 6/1996 | (EP) | ............................. | H04J/14/02 |
| 0808040 | 11/1997 | (EP) | ............................. | H04B/10/08 |

* cited by examiner

*Primary Examiner*—Kinfe-Michael Negash
(74) *Attorney, Agent, or Firm*—Joseph Giordano

(57) ABSTRACT

A cross-connect for a multi-ring, multi-channel telecommunications network, especially for a wavelength-division multiplexed (WDM) optical network. Each of the interconnected rings is self-healing by provision of a redundant counter-rotating ring or excess capacity on pairs of counter-rotating rings. Because an interconnect between self-healing rings does not need to connect working to protection fibers, or similarly redundant fibers, the complexity of the interconnect can be substantially reduced. For several important architectures, the interconnect can be decomposed into one or two 3x3 interconnects. Further, a wide-sense non-blocking 3x3 interconnect can be advantageously implemented as four 2x2 switches, which may be a basic building block of optical switches. A novel algorithm is available to add new paths through such a 3x3 interconnect. The interconnect can be decomposed into one or two 4x4 interconnects when another pair of add/drop lines are added. Such an architecture provides full connectivity between user nodes connected to the add/drop lines and user nodes attached to the rings.

32 Claims, 13 Drawing Sheets

INTER-RING CROSS-CONNECT FOR SURVIVABLE MULTI-WAVELENGTH OPTICAL COMMUNICATION NETWORKS

RELATED APPLICATION

This application claims the benefit of U.S. Provisional Application No. 60/032,120 entitled "Inter-Ring Cross-Connect for Survivable Multi-Wavelength Optical Communication Networks" filed Dec. 6, 1996 for Gee-Kung Chang, Georgios Ellinas, John K. Gamelin, Muhammed Z. Iqbal and Manum R. Khandker. The content of this application is incorporated herein by reference.

BACKGROUND OF THE INVENTION

The invention generally relates to multi-wavelength optical communication networks, especially multi-wavelength optical networks. In particular, the invention relates to cross-connects between multiple rings for which the rings are designed to be self-healing to faults.

The introduction of optical fibers as the transmission medium for communication networks has slowly been altering the fundamental architecture of the networks. Originally, optical fibers simply represented a replacement for the electronic links usually carried on copper cable. The electrical signals, which otherwise would have been transmitted on copper links, were used to modulate lasers on the transmission end, and optical detectors, on the receiver end, were used to reconvert the signal to its original electrical form. That is, the use of optical fibers did not affect the fundamental architecture of the network. Also, the original application of optical fibers was to the long-distance transmissions, but its utility is becoming more obvious to the more local networks.

The existing network architecture upon which the fiber link has been imposed may be characterized as a multi-level mesh. At the level of a Local Access and Transport Area (LATA), each central office is typically connected to several neighboring offices with electrical links having capacity appropriate for that link. This architecture was implemented in hardware designed in the early 1980's and was driven by a paucity of bandwidth and the relatively slow electronics then available.

The voice traffic dominant at the time of the design of the present network is digitized into DS0 channels, each of 64 kb/s (kilobits per second). Twenty-four DS0 channels are multiplexed into a DS1 channel at 1.544 Mb/s, and, if required, 28 DS1 channels are multiplexed in a separate step into a DS3 channel at 44.736 Mb/s. These rates are not exact multiples, and bits are stuffed into the transmission stream as are necessary. Further, each link has its own clock. The result is an asynchronous network in which a high-level multiplexed signal needs to be completely demultiplexed in order to extract any signal or to substitute another low-level signal.

Optical fiber changed the equation because its intrinsic bandwidth is nearly unlimited. In a fiber network, the terminal equipment for the most part determines the bandwidth, and the cost of the link becomes relatively small compared to that of the terminal equipment. As a result, a new standard was proposed and largely accepted in the U.S.A. This standard is referred to as the Synchronous Optical Network (SONET). A closely related architecture, Synchronous Digital Hierarchy (SDH), is followed in Europe. The basic building block is called the Synchronous Transport Signal-Level 1 (STS-1) which has a bit rate of 51.84 Mb/s. The transmission is divided into frames transmitting at a frame rate of 125 µs. The frames are further divided into 810 eight-bit bytes, many of which are overhead. The STS-1 frames are carried on an OC-1 optical channel operating at the same bit rate. Higher rates are available which are multiples of those above. These are STS-N signals, which are formed by simply interleaving N STS-1 signals. Currently, OC-48 fiber links operating at 2488.32 Mb/s represent the most advanced system that is commonly deployed. For the most part, the maximum signal rate is determined by the electronic and opto-electronic equipment attached to the fiber ends and not by the fiber itself. SONET is a synchronous signal, and extracting individual bytes or lower-level channels is much easier than with an asynchronous signal.

The increased capacity of optical fiber has raised concerns about the reliability and survivability of optical networks since a single cable or equipment malfunction can impact a large amount of traffic. Cable cuts are frequent and almost impossible to avoid, whether from human or weather causes, and equipment failures resulting from central-office fires or other disasters cannot be totally eliminated. Accordingly, more survivable network architectures are sought. One architecture that offers high survivability is a self-healing ring. Several versions of this architecture are described by Wu in *Fiber Network Service Survivability*, (Artech House, 1992), pp. 123–207. The self-healing function mitigates against network disasters, but its implementation must be simple, high-speed, and highly reliable. The self-healing should be totally automatic and provide 100% restoration capability for a single fiber-cable cut or equipment failure through its ring topology and simple but fast protection switching scheme. Many self-healing ring architectures have the advantage of being able to recover from the failure of a single node, such as a hub, along with the ability to recover from a cable cut.

An exemplary unidirectional self-healing fiber ring 10 is illustrated in FIG. 1. This is one type of self-healing ring network and is presented here to support the introductory discussion. A more complete description of the different architectures of self-healing rings will be presented later.

In FIG. 1, a number of nodes 12, here illustrated as four nodes A, B, C, D, are interconnected in a ring configuration by two counter-rotating optical fibers 14, 16. That is, one fiber 14 forms a ring around which signals propagate in the counter-clockwise direction while the other fiber 16 forms another ring around which signals propagate in the clockwise direction. Each node 12 can be a central office, a remote distribution point within the local network, or other high-traffic node. Importantly, each node 12 is connected to each of the fibers 14, 16 at two points, one for reception, one for transmission. The first fiber 14 is a working fiber and, in this particular architecture, carries all the traffic. The second ring fiber 16, indicated by the dashed line, is a protection fiber. In normal operation, it is dark for Automatic Protection Switching (APS), but for Path Protection (PP) it carries some or all of the traffic nominally assigned to the working fiber 14. The protection fiber 16 propagates whatever signals it carries around the ring 10 in a direction opposite to that of the working fiber 14, and the choice of which fiber 14, 16 propagates in the clockwise direction is, of course, immaterial.

The number M of nodes 12 within the ring can vary but is generally in the range of 4 to 10. A smaller number of nodes can be accommodated within a mesh architecture without the need for protection fibers or for multi-hop transmission. This difference arises because a ring network of M nodes requires W wavelengths for full mesh connectivity within the ring, where for odd values of M $$W = \frac{M^2 - 1}{8}$$

and for even values of M $$W = \frac{(M+1)^2 - 1}{8}$$

A larger number of nodes introduces a high excess level of traffic through each node that is not needed by that node.

It is assumed that the working and protection fibers 14, 16 are co-located along virtually the same geographic paths so that a cable break arising from a construction accident, a weather disaster, or the like is likely to affect both of them. However, it is also assumed that the fibers 14, 16 are routed such that the different inter-nodal portions extend for the most part along different paths so that cable breaks usually affect only one inter-nodal portion of the dual ring. Although the figures show a neat circular ring, it is to be appreciated that rings can be set up within the existing mesh network, even using existing point-to-point fibers, resulting in a more ragged shape. It is also to be appreciated that these rings can be enlarged or shrunk to a different set of nodes within the ring without necessarily laying new fiber between the nodes.

The most common fiber failure is a cable break 20, illustrated in FIG. 2 as occurring between nodes C and D and assumedly cutting both a portion 14' of the working fiber 14 and the corresponding portion 16' of the protection fiber 16. In the case of Automatic Protection Switching (APS), the APS equipment associated with each node 12 can sense such a fault and activate protection switches 22, 24 associated with the bracketing C and D nodes 12 to transfer signals between the working and protection fibers 14, 16. Similar protection switches are disposed on the other sides of the C and D nodes 12 as well as on both sides of the remaining nodes 12 of whatever type. The counter-rotating protection fiber 16 functionally substitutes for the broken portion 14' of the working fiber 14 and restores the network continuity between all nodes 12.

Self-healing networks also guard against failure of any one node 12, for example, a fire or loss of power in a central office or switching center. Although traffic destined to or originating from that node is typically lost, the traffic between the operational nodes is saved. For APS self-healing networks, the APS equipment in the two nodes bracketing the failed node redirect the traffic from the working fiber to the counter-rotating protection fiber, thus avoiding the failed node.

Thus, the self-healing protects fully against cable breaks and protects against nodal failures except for the loss of traffic originating from and terminating to the failed node.

The self-healing architecture of FIGS. 1 and 2, as well as for other related self-healing rings, introduces bandwidth penalties into both the fibers 14, 16 as well as the nodes 12. However, optical fiber has come to incur a relatively low cost for overall system design, especially when parallel fibers are considered. Also, the SONET architecture has allowed the production of lower cost equipment, particularly of add/drop multiplexers (ADMs), which can be used in the nodes 12 to extract or insert separate lower-level channels from a SONET signal on the ring. As a result, the excess capacity and redundant processing of signals for a self-healing ring are no longer prohibitively expensive.

Some of the more important architectures for self-healing rings will now be described in general terms. Several embodiments of the invention specifically described below will incorporate these different architectures.

Unidirectional rings use two fibers, one working fiber and one protection fiber. They are called unidirectional because all working traffic goes around the dual ring in one direction. There are two principal types of unidirectional rings, Automatic Protection Switching (APS) and Path Protection (PP).

A loop-back APS ring has been described with reference to FIGS. 1 and 2, and that architecture is referred to as a folded U-SHR architecture or (U-SHR/APS). Note that APS corresponds to "line switching", that is, a physical rerouting over different lines.

Self-healing can also be achieved in a unidirectional ring by low-speed Path Protection in an architecture called path protected SHR (U-SHR/PP) or dedicated protection rings. This form of path protection is based usually on the concept of a dual feed of signal (1+1) in which two transmitters at each node transmit identical signals on the two fibers propagating in opposed directions. The counter-propagating signals provide network survivability when a link is cut. In normal operation, one receiver at each node selects the signal from the working fiber, but when the working fiber has been cut for that transmission the receiver can select the protection fiber. In practice, the receiver selects the stronger of the two incoming signals.

Bidirectional rings may use two or four fibers. They are called bidirectional because the working traffic can go around the ring in either direction. The transmitting node makes an informed choice as to which direction it should transmit a signal to the receiving node. Even though usually the minimum distance is preferred, sometimes a longer path is chosen, for instance, when it is desired to evenly distribute the load.

A four-fiber bidirectional ring referred to as B-SHR/4 or a shared protection ring includes two working fibers and two protection fibers. Each working fiber is intended to carry half the total traffic. To recover from link failure, B-SHR/4 uses line protection switching, for example APS, to perform a loop-back function to avoid cable cuts or node failures. This architecture requires a 1:1 nonrevertive lower-speed electronic protection switch at each office. With the nonrevertive protection switch, the signals need not be switched back when the failed line is repaired.

A two-fiber bidirectional ring, referred to as B-SHR/2, uses two fibers, both designated as working fibers. The traffic is divided generally equally between the two counter-propagating fibers, and each fiber is operated at only half its total capacity. The other half of the capacity of each fiber is reserved to protect the counter-propagating fiber. In the case of a link failure whether due to fiber break or equipment failure at a node, the transmitter switches from one line to the other in conjunction with time-slot interchange to automatically redirect traffic to fill vacant time slots propagating in the opposite direction so as to avoid the failure. Such redirection resembles automatic protection switching even though APS is usually associated with line protection switching, which this described procedure does not perform. For wavelength-division multiplexing, to be discussed later with respect to the invention, the two sets of signals are wavelength multiplexed rather than time multiplexed. The bandwidth of all working paths should occupy less than 50% of the entire ring bandwidth to allow recovery of all working paths against single transmission line failure. Although such reduced bandwidth may seem wasteful, the cost of increasing the system capacity should be compared with the cost of more complex control and administration.

Another recent development in high-speed communication networks involves wavelength-division multiplexing (WDM). As noted before, optical fiber has an extremely wide bandwidth, significantly larger than the available electronic frequencies available to impress optical data signals on the fiber. Accordingly, it was early recognized that multiple electrical data signals can modulate different laser transmitters having W separated emission wavelengths $1_1$, $1_2$, . . . $1_W$, and the outputs of the different lasers are impressed upon a single optical fiber. At the receiving end, the different optical signals can be optically separated and then electrically detected. The modulation and detection rates for a separate channel occur at the electrical data rate of that channel rather than the overall optical data rate. The number W of WDM channels is limited in common, large sized networks to about 8 to 32.

Although WDM was initially thought of only as a capacity multiplier, more sophisticated WDM architectures have been suggested, e.g., by Brackett et al. in "A Scalable Multiwavelength Multihop Optical Network: A Proposal for Research on All-Optical Networks", *Journal of Lightwave Technology*, vol. 11, 1993, no. 5/6, pp. 736–753. These advanced architectures become particularly advantageous if the wavelength-differentiated optical signals can be routed through a node or other switching point according to their respective optical wavelengths (or frequencies) without the need to convert the signals to electronic form. That is, two optical signals coming into the switching point on a single fiber can be switched into different outgoing directions according to their optical wavelengths, all the while the signals remain in the optical domain. Such optical switching has the further advantage that the switching is independent of the signal format of the different WDM channels. For example, one or more optical wavelengths could be dedicated to an analog cable television signal while other optical wavelengths are dedicated to digital SONET signals. Of course, the formatting of the television channels is completely different from that of the SONET channels. Nonetheless, a WDM switch operating according to the optical carrier wavelength equally well switches the television and SONET signals without regard to their format. Even within the confines of a SONET network, a WDM switch switches SONET channels without regard to their bit rates, that is, without regards to the OC level. That is, multiple OC levels can be accommodated within a single network. Further, the OC level is not critical for optical switching. The terminal nodes common to channels of different rates need to operate at the highest optical channel rate. However, the nodes receiving or transmitting only a lower-rate signal need to operate only at the lower rates. Thereby, lower-cost, low-capacity terminals can be attached to a network including higher-capacity terminals.

Wavelength-division multiplexing offers many advantages, not the least of which is the multiplication of network capacity without needing to lay additional fiber. However, its integration with SONET and survivable rings remains to be shown. Elrefraie et al. have suggested one self-healing ring in "Self-healing WDM ring networks with all-optical protection path", *Optical Fiber Conference* '92, paper ThL3, pp. 255, 256 and in "Multiwavelength Survivable Ring Network Architectures", *Proceedings of the International Communication Conference*, Geneva, Paper 48, 7 pp. Wu has suggested a WDM self-healing loop, ibid., pp. 189–195, but the architecture is narrow, overly general, and does not take advantage of the available WDM switching components.

We observe that WDM technology is well suited for ring architectures. A fundamental structure of a 2×2 multi-wavelength switch 26 is illustrated in FIG. 3. It is connected through two ports to the receiving and transmitting ends of an optical fiber 27, which is assumed to be connected through other similar switches 26 in a loop configuration. The multi-wavelength switch 26 has the capability of selecting one or more optical wavelength channels for adding and dropping. That is, the switch 26 can select one (or possibly more) of the WWDM channels in the loop fiber 27 to remove the signal carried by that channel from the fiber 27 and substitute another signal at the same optical wavelength into the loop fiber 27. Such a switch is called a wavelength-selective add/drop switch. The added and dropped signals are transferred via drop and add fibers 28, 29 to and from a nodal network 30, which may be a multiplexer/demultiplexer for an electrical network or may be another network element.

For Automatic Protection Switching (APS) self-healing rings, the loop fiber 27 is the working fiber. APS line switching equipment located on both sides of the switch 26 selectively connects the working fiber to the protection fiber, which does not go through an equivalent switch to the nodal network 30. For Path Protected (PP) self-healing rings, both the working and protection fibers have their own switches 26, and additional circuitry within the nodal network 30 determines which fiber is being used for a particular signal.

The illustrated multi-wavelength switch 26 is a 2×2 cross-connect switch that can assume two states for each of the W optical wavelengths. In the bar state, the signals of that wavelength carried on the ring fiber 27 remain on the ring fiber 27. However, in the cross state, optical signals received from the ring fiber 27 at one or more optical wavelengths are switched to the drop fiber 28 while other data signals of a same optical wavelengths are received from the add fiber 29 and transmitted onto the ring fiber 27.

There are at least three technologies for implementing the multi-wavelength switch 26.

A first technology involves a hybrid mechanically actuated optical WDM switch, such as described by Iqbal et al. in "High Performance Optical Switches For Multiwavelength Rearrangeable Optical Networks", *Government Microelectronic Circuits Application Conference (GOMAC)* '94, San Diego, Calif., November 1994, 3 pp. This 4-wavelength 2×2 switch includes cascaded multilayer thin-film interference filters and discrete 2×2 cross-bar, relay-actuated optical switches connected to the outside with optical multiplexers and demultiplexers. The hybrid, fiber-based, WDM switch demultiplexes the input wavelengths to different 2×2 optical switches, and the signals that are optically switched by mechanical actuation are recombined at the output. The relay-actuated optical switches are mechanical switches in which fibers connected to the two inputs are mechanically moved into alignment with different output fibers. Although this technology is conceptually relatively unsophisticated, its sub-second switching speed is satisfactory for many envisioned architectures, it offers the assurance and reliability of a mechanical part, and is currently commercially available from JDS Fitel.

The second technology involves acousto-optical tunable filters (AOTFs), usually formed in a $LiNbO_3$ substrate, in which the selected optical frequencies are related to RF frequencies impressed on an interdigitated electrode formed over an optical waveguide in the piezo-electric $LiNbO_3$ substrate, causing the selected signal to change its polarization state and thus to be switched by a polarization coupler. Such AOTFs are described by Cheung et al. in U.S. Pat. No. 5,002,349.

A third technology involves liquid-crystal switches, as described by Patel et al. in U.S. Pat. Nos. 5,414,540 and 5,414,541 and in "Liquid Crystal and Grating-Based Multiple-Wavelength Cross-Connect Switch", *IEEE Photonics Technology Letters*, vol. 7, 1995, pp. 514–516. By means of wavelength-dispersive layers and segmented liquid-crystal polarization-rotation layers, the different WDM channels can be switched in different directions.

Although it is possible to extend the optical signals further into the nodal network 30, at the present time it is assumed that the nodal network 30 is formed around an electronic switch 31, illustrated in FIG. 4. An optical demultiplexer 32 receives the WWDM signals on the drop fiber 28 and splits them into separate optical paths according to their wavelengths $1_1, 1_2, \ldots 1_W$. An optical detector array 33 converts the optical signals to electrical signals for input to the switch 31. Similarly on the output side, a laser array 34 is controlled by electrical outputs of the switch 31 to emit modulated optical signals of wavelengths $1_1, 1_2, \ldots 1_W$. An optical multiplexer 35 combines the WWDM signals onto the add fiber 29. The switch 31 has additional electrical input and output lines 36, 37, for example, to the local loop network. These additional input and output lines 36, 37 may be characterized as drop/add lines.

The add/drop ports on the switch 31 are useful for a number of reasons. In one type of use, they may provide links to external users, whether single users or used attached to local-area networks (LANs) connected to the switch 31. The add/drop ports may provide a gateway for interconnections of different LANs which are designed for lower-density traffic than that of the traffic being switched between the fibers 28, 29. The add/drop ports may also provide a link to other networks at a single wavelength in the case where low-bandwidth connection is all that is required. In a second type of use, the add/drop ports may provide a monitoring point for inter-ring traffic so that the local controller can check the traffic before passing it between rings. In a third type of use, the add/drop ports provide a point for wavelength interchange between the rings. That is, if an optical data signal on a first ring is desired to be transferred to a second ring, but at a different optical wavelength, it can be dropped at the switch, converted to a different wavelength by all-optical or optoelectronic means, and reinserted into the network by being added at the same switch. In the case of the electronic switch 31 shown in FIG. 4, the wavelength conversion is performed by assigning the same data signal to different wavelengths in the optical detector array 33 and the laser array 34. Finally, the add/drop ports provides a port for the local switch controller to receive or inject signaling information.

A controller 38 controls the switching states of the switch 31, and may receive network control information over one of the WDM channels. For a SONET network, the SONET framing and other functions can be incorporated into the switch 31 and controller 38. The ADM switch system shown in FIG. 4 is connected to only one fiber of a self-healing ring. For an APS ring, only one connection to the working fiber is required since the APS equipment provides access to the protection fiber, but for a path protected ring both fibers need to be accessed.

ADMs of the type mentioned above may be satisfactory for the simple nodes distributed around a ring, but are insufficient for completely implementing a large, complex network. As mentioned above, rings are limited to a fairly small number of nodes. It is greatly desired to increase the number of accessible nodes by interconnecting multiple rings through use of at least one inter-ring node. Also, as mentioned before, rings are often formed from already existing inter-office trunks that overall resemble a mesh. Thus, ring interconnections are usually established at larger central offices having trunk lines to at least four other offices. As a result, the inter-ring node must be connected to two separate rings as well as perform the add/drop functions expected at a central office.

As shown in the network diagram of FIG. 5, two self-healing rings $10_1, 10_2$ are interconnected by an inter-ring node 40. Each ring $10_1, 10_2$ includes a respective working fiber $14_1, 14_2$ and a respective protection fiber $16_1, 16_2$. More specifically, the inter-ring node 40 is connected to input fibers $14_{1\text{-}IN}, 14_{2\text{-}IN}, 16_{1\text{-}IN}, 16_{2\text{-}IN}$ and to output fibers $14_{1\text{-}OUT}, 14_{2\text{-}OUT}, 16_{1\text{-}OUT}, 16_{2\text{-}OUT}$. The inter-ring node 40 is also connected to two pairs $42_1, 42_2$ of add/drop fibers comprising respectively add fibers $42_{1\text{-}IN}, 42_{2\text{-}IN}$ and drop fibers $42_{1\text{-}OUT}, 42_{2\text{-}OUT}$. It is assumed that the add/drop fibers ultimately connect to different types of transmission lines, e.g., through a switch to the local loop network. The two pairs $42_1, 42_2$ of add/drop fibers allow the inter-ring node 40 to independently add/drop signals on the two rings $10_1, 10_2$ without concern of wavelength contention as long as the same wavelength is not dropped twice to the same ring. Since the add/drop fibers $42_1, 42_2$ are typically routed within conventional switching offices or hubs that do not utilize wavelength-division multiplexing, the add/drop fibers $42_1, 42_2$ are typically bundles of W such fibers, where W is the number of WDM wavelengths and unillustrated multiplexers and demultiplexers may be required depending on the type of optical switching element. The following description and illustrations will only occasionally address this distinction between ring fibers and add/drop fibers.

The inter-ring node 40 can thus be characterized as a 6×6 switch, as shown in the schematic of FIG. 6. Furthermore, in a WDM network, the W wavelengths must be separately switched so that the 6×6 switch is in some sense replicated W times. In most current demonstration projects, W is no more than 8. In WDM networks, it is not atypical at the present time because of preexisting nodal architectures that the fibers $14_1, 14_2, 16_1, 16_2$ in the two rings $10_1, 10_2$ are each carrying WWDM signals while the add/drop fibers $42_{1\text{-}IN}, 42_{2\text{-}IN}, 42_{1\text{-}OUT}, 42_{2\text{-}OUT}$ are each carrying only one optical signal so they each need to be arranged in bundles of W add/drop fibers if full add/drop capability is to be achieved.

If the switching is performed with the previously described mechanically actuated optical switches, each W-fold WDM signal must be demultiplexed into W optical signals which are led on separate fibers to different wavelength planes of the 6×6 switch and the outputs of the planes are multiplexed into an optical WDM output signal. If the switching is done electronically, as is conventional now, optical sources and detectors are additionally required, but the same size 6×6 electronic switch is required.

Such a switch has the disadvantage of being complex. The most straightforward implementation requires for each wavelength plane six 1×6 switches on the input side interconnected to six 6×1 switches on the output side. This structure can be implemented with multiplexers, demultiplexers, and mechanically actuated optical switches, but it requires many components, e.g., 96 1×6 or 6×1 switches for 8 optical wavelengths. Further, it is preferred to eliminate the multiplexers and demultiplexers and the parallel replication. Simultaneous multi-wavelength switching reduces the count of switching elements and eliminates the need for wavelength multiplexers and demultiplexers.

Optical (photonic) switches are known that can selectively switch signals of different wavelength onto different output ports. However, these are generally based on 1×2 or 2×2 switching units, such as illustrated in FIG. 3, and larger switches are built up from the smaller switching units. Hence, a relatively large number of these switching units are required for a 6×6 photonic switch desired for interconnecting two SONET rings. Such optical switching units present challenges in fabrication, and integration of a large number of switching units on a single substrate has not been commercially achieved.

Therefore, it is greatly desired to reduce the complexity of a photonic switch usable between two self-healing rings.

SUMMARY OF THE INVENTION

In one aspect, the invention can be summarized as the interconnection between two or more self-healing optical network rings in which the interconnection can be simplified because of the self-healing architecture of the connected rings. In particular, because several of the multiple inputs to the interconnect are intended to be redundant or otherwise not intended to be selectively interconnected, the complexity of the interconnect can be reduced by eliminating those inputs and outputs not needing to be interconnected even in case of a failure in either of the connected networks. The forms of the inter-connect are presented for 2-fiber and 4-fiber, uni-directional and bi-directional self-healing rings.

In another aspect of the invention, the interconnection between multiple self-healing rings is shown to be independent of the self-healing functions of the multiple rings. Therefore, the interconnection state of a cross-connect can remain constant while separate apparatus is healing a fault in one or the other of the rings.

Many important interconnects, both between two self-healing rings and for other applications, can be accomplished with at least one 3×3 interconnect. Such a 3×3 interconnect is advantageously implemented with four 2×2 interconnects so as to be wide-sense non-blocking. Possible wavelength contention at the add/drop lines of the interconnect can be removed by enlarging it into a 4×4 interconnect.

An algorithm is presented for assigning switching states for new paths through the four 2×2 switches composing the wide-sense non-blocking 3×3 interconnect. The algorithm recognizes that two combinations of states of the four 2×2 switches can be associated with each state of the 3×3 interconnect as viewed from the interconnect ports. If also recognizes that only three reconfigurations of a fully connected interconnect state are possible, and one of the two possible switch state combinations provides an allowable transition.

BRIEF DESCRIPTION OF THE DRAWING

The present invention will be described with reference to the accompanying drawing of which.

DESCRIPTION OF THE INVENTION

The invention recognizes that the cross-connect between self-healing rings requires fewer cross-connecting points than are apparent from a first inspection of the number of ports to the cross-connects. Other inventive features follow from this new architecture.

Figure 5:
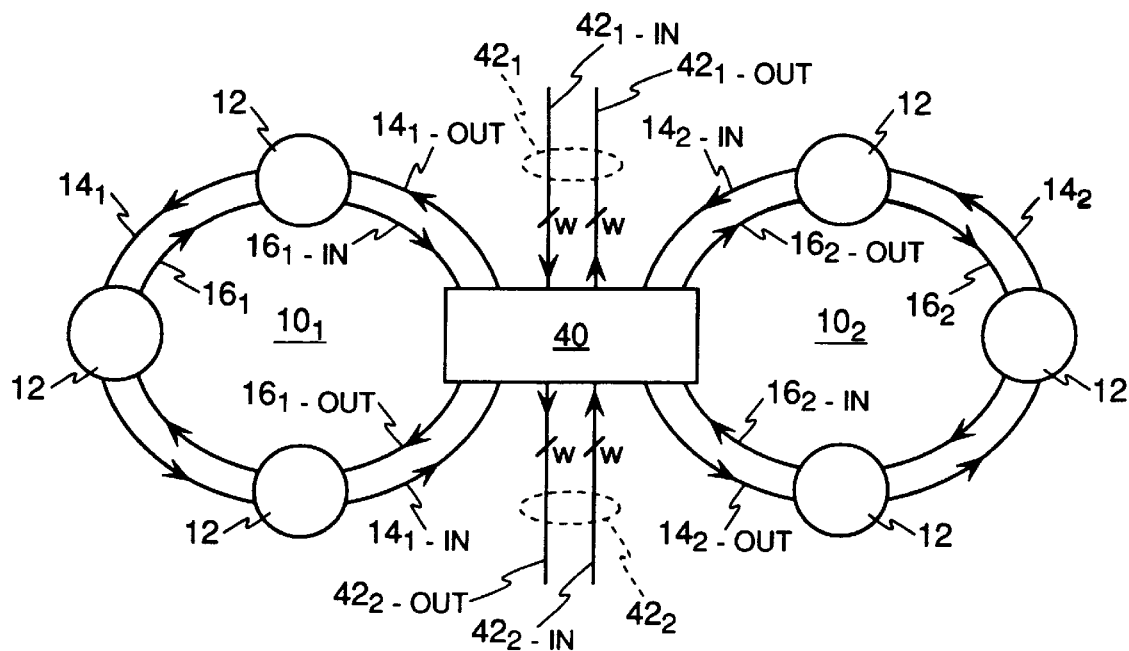
FIG. 5 is a network diagram of a node connecting two self-healing multi-wavelength rings, in particular rings using path protection.
Figure 6:
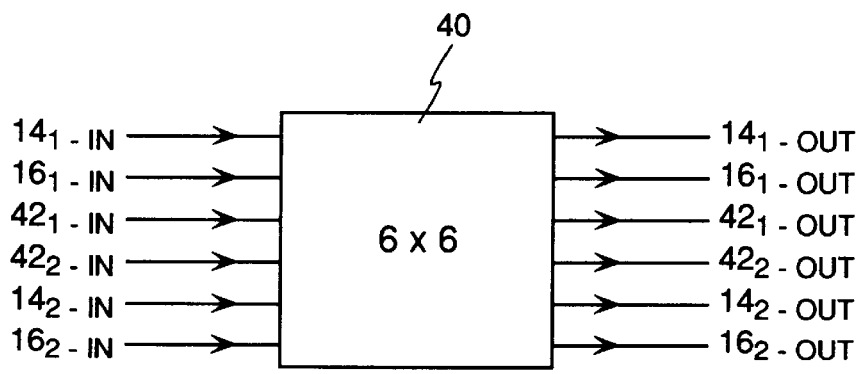
FIG. 6 is a schematic diagram of the switch required at the initial level of consideration for the interconnect node of FIGS. 5 and 21.

We observe that the full functionality of the 6×6 switch of FIG. 6 is not required to connect the self-healing rings $10_1$, $10_2$ of FIG. 5 because of the constraints imposed on the connections between the working and protection fibers. Although the description until now about FIGS. 5 and 6 has for the most part been quite general, the interconnected network of FIG. 5 will be assumed to be based on two unidirectional path-protected self-healing rings $10_1$, $10_2$ (U-SHR/2-PP).

Figure 7:
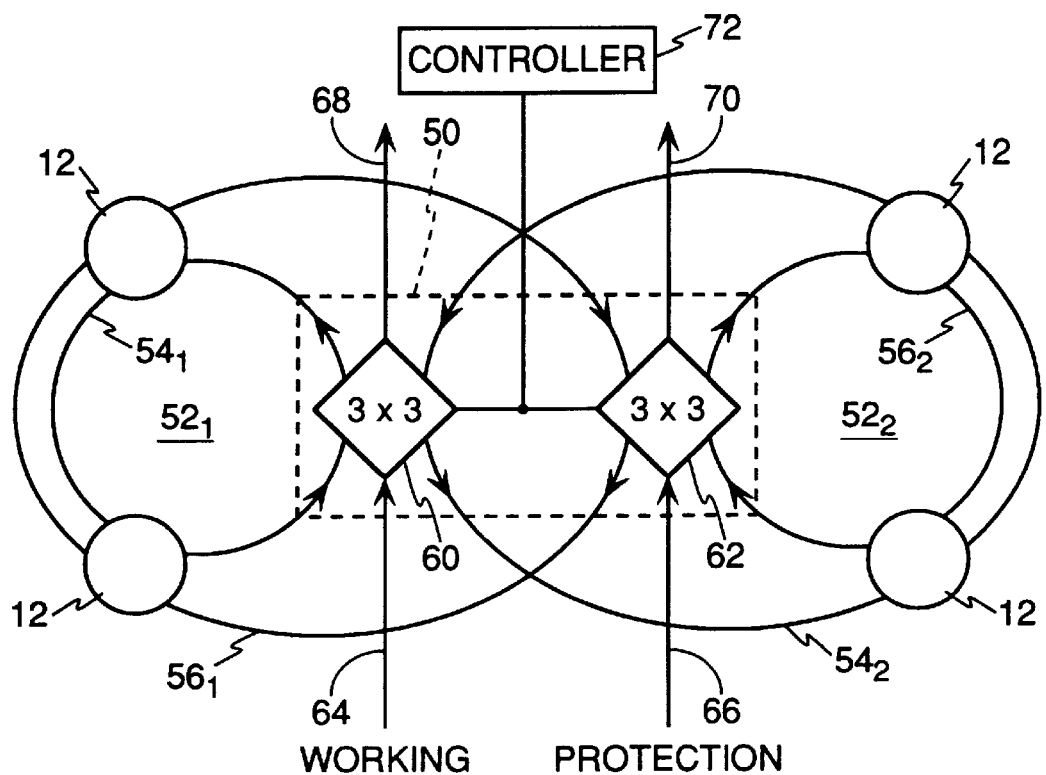
FIG. 7 is a network diagram of a simplified inter-ring cross-connect for the network of FIG. 5 using 3×3 switches.

In FIG. 7 is shown a two-ring U-SHR/2-PP network, that is, a unidirectional, two-fiber, path-protected self-healing network. An inter-ring node 50 connects two communication rings $52_1$, $52_2$. Each communication ring $52_1$, $52_2$ includes a respective working fiber $54_1$, $54_2$ and a respective protection fiber $56_1$, $56_2$. In this architecture, within each ring, the working or protection fibers $54_1$, $56_1$, or $54_2$, $56_2$ are normally carrying duplicate signals in counter-rotating directions. Note that the figure for convenience has interchanged the inner and outer positions of the working and protection fibers between the two rings. Other access nodes 12 are connected along the respective rings $52_1$, $52_2$. The 6×6 switching function of the node 50 can be performed by two 3×3 switches 60, 62. The first 3×3 switch 60 has two of its inputs and two of its outputs connected to the working fibers $54_1$, $54_2$ of both rings $52_1$, $52_2$ while the second 3×3 switch 62 is similarly connected to the protection fibers $56_1$, $56_2$ of both rings $52_1$, $52_2$. Each 3×3 switch 60, 62 also has an input receiving a respective add fiber 64, 66 and an output transmitting onto a respective drop fiber 68, 70.

For self-healing networks using Path Protection (PP), there is no need to interconnect working and protection fibers since they are already carrying equivalent information. Specifically, each data transmitter impresses the same signals on both the associated working and protection fibers in a (1+1) protection scheme.

One 3×3 switch 60 of the PP network of FIG. 7 can be viewed as the working cross-connect while the other 3×3 switch 62 is the protection cross-connect. For survivability, a cross-connect controller 72 needs to simultaneously set both 3×3 switches 60, 62 to a common switching state so that signals follow equivalent paths in both the working fibers $54_1$, $54_2$ and the protection fibers $56_1$, $56_2$. As a result, if a failure occurs in either of the working fibers $54_1$, $54_2$, the protection fibers $56_1$, $56_2$ are already properly interconnected and carrying the desired signals for the receivers at the various intra/inter-ring nodes to pick up so that the cross-connect controller 72 does not need to reconfigure the 3×3 switches 60, 62 in response to a ring failure. The cross-connect controller 72 reconfigures the 3×3 switches 60, 62 only in response to long-term changes in the traffic pattern, on periods of the order of hours. Of course, once a ring failure has been detected, the traffic can be rearranged, but the rearrangement occurs after the failure has been successfully circumvented. The cross-connect controller 72 receives reconfiguration commands from an unillustrated network controller, and the commands can be received over the add/drop lines 64–67 according to a control protocol that is beyond the scope of this invention. The common state configuration of the two 3×3 switches 60, 62 will likely involve the common cross-connect controller 72, a source of single-point failure in an otherwise redundant design. However, the replication of the two switches 60, 62 eliminates the single-point failure mode inherent in the unitary 6×6 cross-connect of FIG. 6.

For the simplified PP cross-connect 50 of FIG. 7, an inoperable working or protection fiber in one network does not supply data to the corresponding fiber on the other network. As a result, this PP design can tolerate anywhere from one fault per ring to one fault for the entire network depending on where the fault or faults occur. In contrast, as will be discussed later, APS networks can tolerate one fault per ring regardless of the location of the faults.

The simplification allowed by implementing the 6×6 cross-connect 40 of FIG. 6 with the two 3×3 switches 60, 62 of FIG. 7 is purchased at a cost of losing some functionality. Although there are two pairs of add/drop lines 64, 66, 68, 70, there is only one pair 64, 68 for the working fibers $54_1$, $54_2$. As a result, at any time only a single signal of a given wavelength can be dropped from and a single signal at that wavelength added to the combination of the two rings $52_1$, $52_2$. There is no limitation on the traffic interconnecting the rings (inter-ring traffic). The limitation applies only to the traffic to and from the user at the inter-ring access node 50 accessing the network through the add/drop lines 64, 66, 68, 70. No two ring users 12 attached on different rings $52_1$, $52_2$ can drop the same wavelength to the inter-ring access node 50, and the user at the inter-ring access node 50 cannot set up a connection with two ring users 12 in different rings $52_1$, $52_2$ using the same wavelength. This limitation may result in some additional blocking for the traffic to and from the inter-ring access node 50.

If interference is to be avoided between two signals of the same wavelength being added or dropped at the inter-ring access node 50, a dual-ring control algorithm under the control of a multi-ring network controller needs to implemented which resolves such wavelength contentions between the two rings $52_1$, $52_2$. The master control algorithm could attempt to reallocate wavelength assignments on one or the other of the rings $52_1$, $52_2$ to avoid such add/drop contentions.

Figure 8:
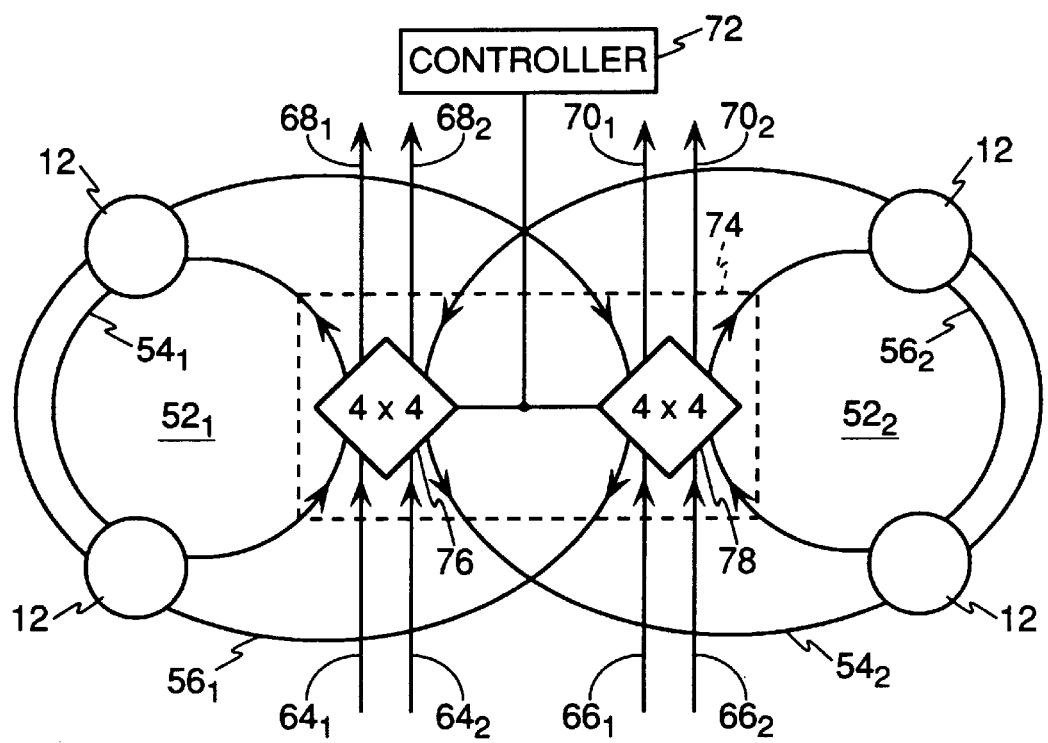
FIG. 8 is a network diagram of a inter-ring cross-connect similar to that of FIG. 7 but using 4×4 switches.

The problem of wavelength blocking for add/drop signals at the inter-ring node 50 can be avoided, as illustrated in the network diagram of FIG. 8, with a less simplified PP cross-connect 74 including two 4×4 switches 76, 78, each having a pair of respective add lines $64_1$, $64_2$ or $66_1$, $66_2$ and a pair of respective drop lines $68_1$, $68_2$ or $70_1$, $70_2$. As will be explained later in more detail, the hardware requirements of 4×4 switches are much greater than for 3×3 switches, but the hardware complexity purchases a significant simplification in the network control algorithms since the two rings $52_1$, $52_2$ do not need to coordinate between them which is dropping or adding a signal at a particular wavelength at the inter-ring node 74. Two add lines $64_1$, $66_1$ and two drop lines $68_1$, $70_1$ may be dedicated to the first ring $52_1$ while the other two add lines $64_2$, $66_2$ and other two drop lines $68_2$, $70_2$ may be dedicated to the other ring $52_2$. The increased hardware complexity does not reduce the inter-ring blocking problem and its associated control problem of assigning wavelengths to reach across multiple rings, but it does resolve the intra-ring blocking problem of reaching the inter-ring node 74 from a node 12 located in the same ring. If a path exists between the inter-ring node 74 and another node 12 within one of the rings $52_1$, $52_2$, the management algorithm does not need to consider what is the wavelength assignments that already exist in the other of the rings $52_1$, $52_2$.

Figure 1:
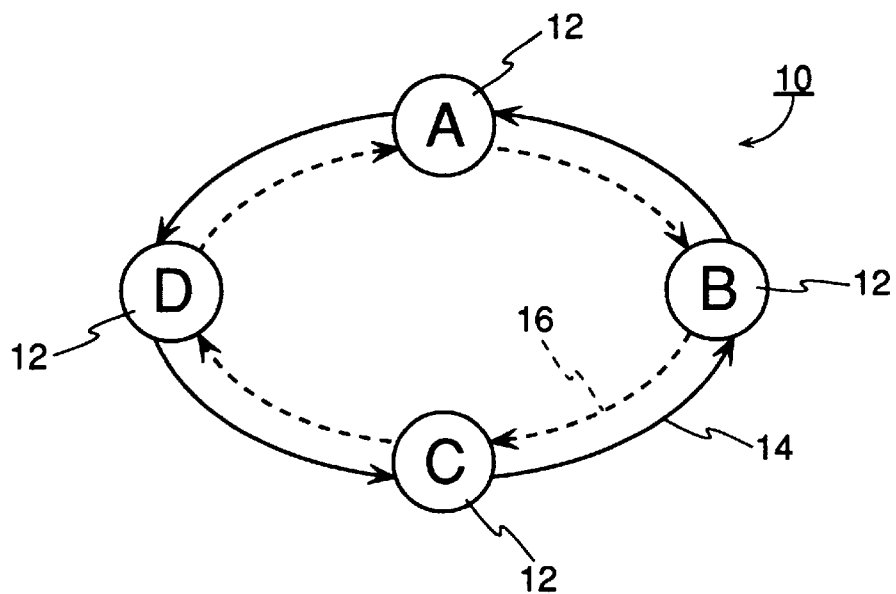
FIG. 1 is a network diagram of a self-healing communication ring of the prior art.
Figure 2:
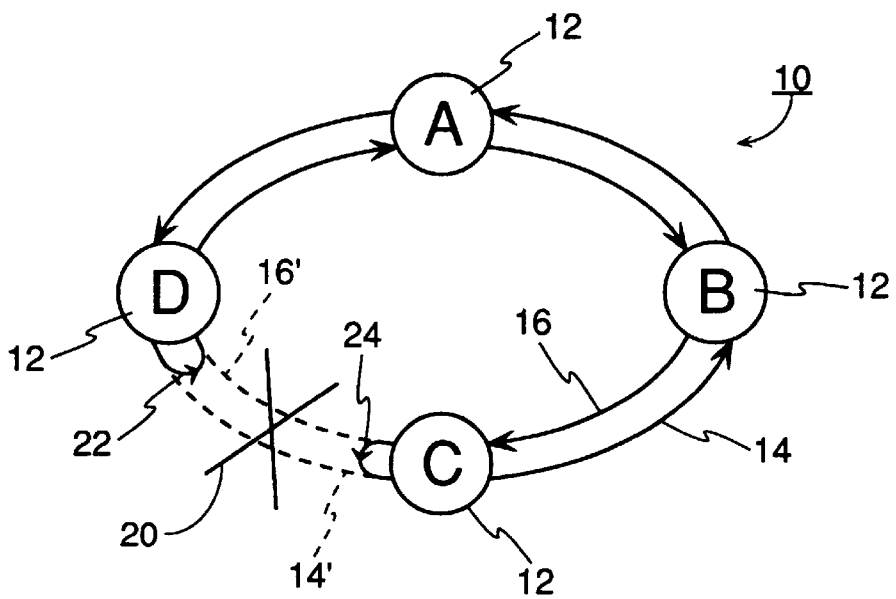
FIG. 2 is a network diagram showing how the ring of FIG. 1 can be reconfigured to survive a cable cut.
Figure 9:
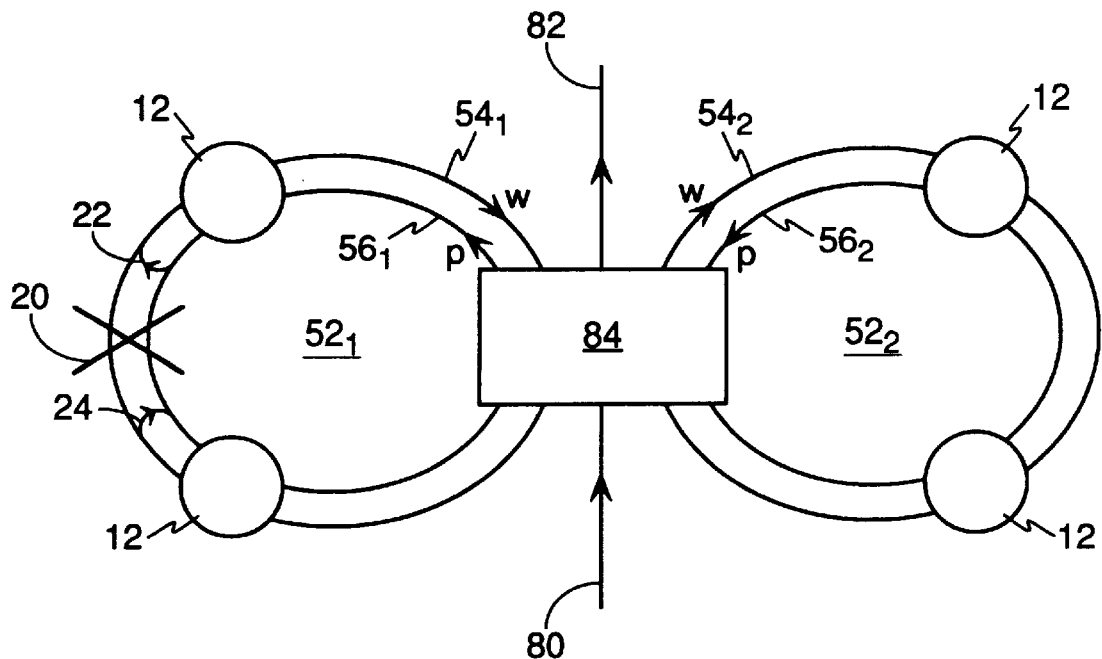
FIG. 9 is a network diagram of a two unidirectional self-healing rings with Automatic Protection Switching (APS) that are interconnected.

Another self-healing ring network, illustrated in FIG. 9, is the two-fiber unidirectional self-healing ring with automatic protection switching (U-SHR/2-APS). A cross-connect 84 connects two rings $52_1$, $52_2$ comprising respective working fibers $54_1$, $54_2$ and protection fibers $56_1$, $56_2$. In normal operation, only the working fibers $54_1$, $54_2$ in the two rings $52_1$, $52_2$ carry data so that the data is being carried unidirectionally, clockwise as illustrated. For self-healing networks using Automatic Protection Switching (APS), APS equipment is associated with each node 12 of the rings $52_1$, $52_2$, including the inter-ring node 84 to interconnect within the respective rings $52_1$, $52_2$ the working fiber $54_1$, $54_2$ to the associated protection fiber $56_1$, $56_2$ when a failure occurs. Conventional APS equipment detects a cable break or nodal failure from the SONET overhead and thereafter enables the links 22, 24 shown in FIG. 2, between the working and protection fibers. This linking is done for all wavelengths so that a wavelength-selective APS switch is not required. For multi-wavelength rings, alternative forms of APS can be utilized, for example, detecting the optical power on the working fiber. If one ring $52_1$ develops a break 20, the APS equipment quickly enables links 22, 24 to reroute the data onto the protection fiber $56_1$ so as to avoid the break 20. Only a single add line 80 and a single drop line 82 connected to the respective add/drop ports are associated with the cross-connect 84 between the two APS rings $52_1$, $52_2$, so that the simplification again incurs the constraint of limiting simultaneous adding or dropping of the same wavelength on both rings.

Figure 10:
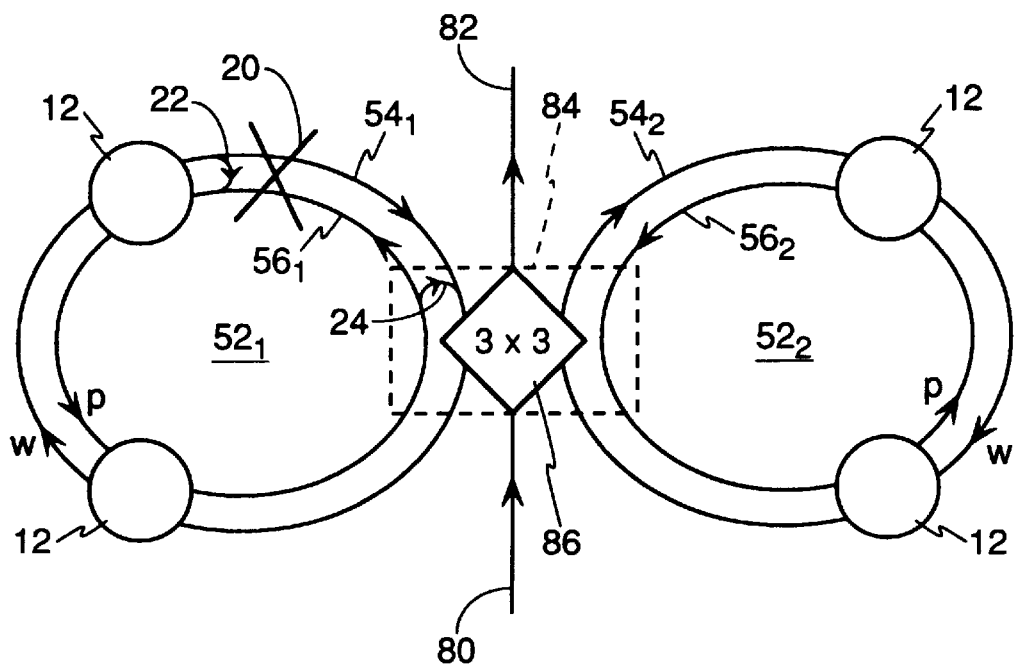
FIG. 10 is a network diagram of a simplified cross-connect for the network of FIG. 9 using a 3×3 switch, which is wide-sense non-blocking when implemented using 2×2 switches.

Viewed most generally, the cross-connect for this two-fiber APS network should be a 6×6 switch, and eight 6×6 switches are required for an 8-wavelength WDM system. However, we observe that the protection fiber $56_1$, $56_2$ does not need to be switched at any ring access node 12 or at the cross-connect 84 since it is acting simply to bridge the missing portion of the working fiber and the automatic protection system 22, 24 does the only required protection switching. That is, the cross-connect 84 never switches to or from a protection fiber $56_1$, $56_2$. This constraint is allowed even for a line failure in the path from a node 12 to the cross-connect 84 because of the activatable APS links adjacent to the cross-connect 84. Hence, as illustrated in the network diagram of FIG. 10, the cross-connect 84 can be implemented as one 3×3 switch 86 having inputs from the two working fibers $54_1$, $54_2$ and from the add line 80 and having outputs to the two working fibers $54_1$, $54_2$ and to the drop line 82. The two protection fibers $56_1$, $56_2$ are permanently connected around the 3×3 switch 86. The controller for the 3×3 cross-connect 86 is not illustrated.

Figure 11:
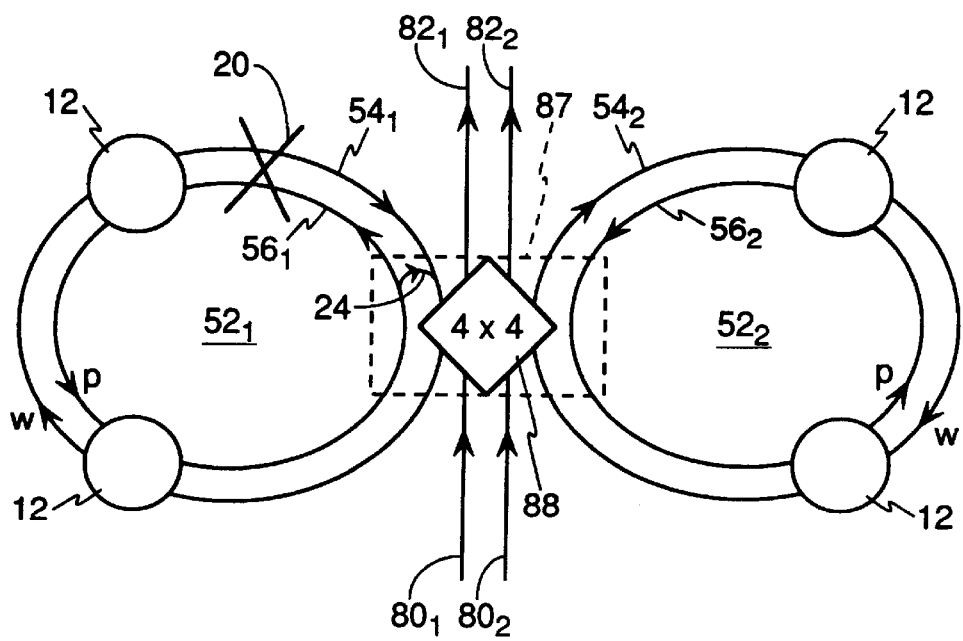
FIG. 11 is a network diagram of a simplified cross-connect similar to that of FIG. 10 but using 4×4 switches.

The wavelength contention problems with the add/drop lines at the inter-ring cross-connect using 3×3 switches can be eliminated, as illustrated in the network diagram of FIG. 11, with a somewhat simplified cross-connect 87 including a 4×4 switch 88 connected to two add lines $80_1$, $80_2$ and two drop lines $82_1$, $82_2$, which are connected to respective add and drop ports.

The preceding embodiments of interconnected self-healing rings illustrated in FIGS. 5 and 9 are both unidirectional in the sense that data normally propagates in a given direction around the ring (although in the 1+1 architecture equivalent data is transmitted in both directions). The reverse-rotating ring is used only for protection. Unidirectional rings enjoy architectural simplicity but do not fully utilize the bandwidth of the network, which is usually determined by the bandwidth of the electronics at the nodes. If two adjacent nodes 12 in a uni-directional ring are interchanging large amounts of data, in one direction the data needs to travel only a small portion of ring while in the second direction the data needs to traverse all the other nodes in the ring before reaching the desired node. As a result, frequency reuse in the case of unidirectional WDM rings provides only marginal increase in total capacity. On the other hand, in bidirectional rings, two working fibers circle the ring and provide two counter-propagating paths linking any pair of nodes. The selection of which working fiber is chosen for a particular channel may depend on many factors, but, under one rule, the working fiber with the shortest path would be selected. This control protocol would halve the maximum transmission distance and would allow effective frequency reuse especially if neighboring nodes tend to exchange larger amounts of traffic than separated nodes.

Figure 12:
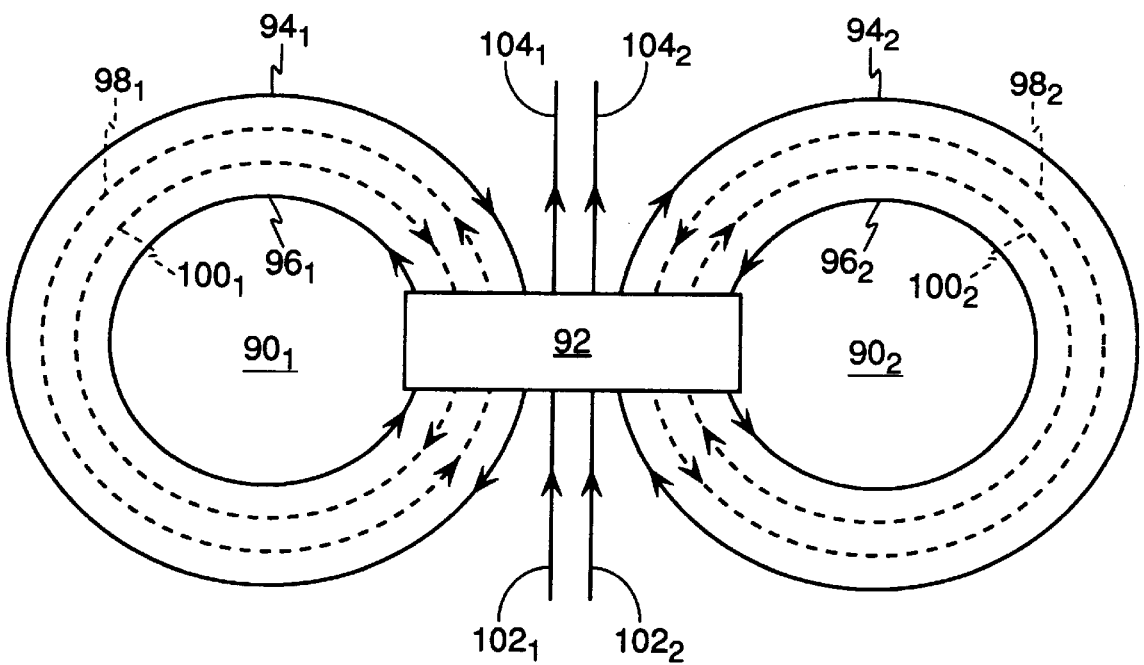
FIG. 12 is a network diagram of two interconnected bidirectional self-healing rings using four fibers apiece (B-SHR/4)

In FIG. 12 is illustrated an interconnected WDM network of two four-fiber bidirectional APS self-healing rings $90_1$, $90_2$ (B-SHR/4-APS) interconnected by a cross-connect 92.

Each ring $90_1$, $90_2$ includes a respective clockwise propagating working fiber $94_1$, $94_2$ and a respective counter-clockwise propagating working fiber $96_1$, $96_2$. Associated with each working fiber $94_1$, $94_2$, $96_1$, $96_2$ is a parallel but counter-propagating protection fiber $98_1$, $98_2$, $100_1$, $100_2$. Unillustrated automatic protection switches associated with the nodes 12 of the two rings $90_1$, $90_2$ selectively loop signals from one of the working fibers $94_1$, $96_2$, $96_1$, $96_2$ to its associated protection fiber $98_1$, $98_2$, $100_1$, $100_2$ when a fiber break or nodal failure is detected. That is, line switching is used to heal a break and nodal failure. The cross-connect 92 includes two add fibers $102_1$, $102_2$ and two drop fibers $104_1$, $104_2$ connected to respective add/drop ports so as to enable the cross-connect 92 to independently add and drop from the two rings $90_1$, $90_2$.

Figure 13:
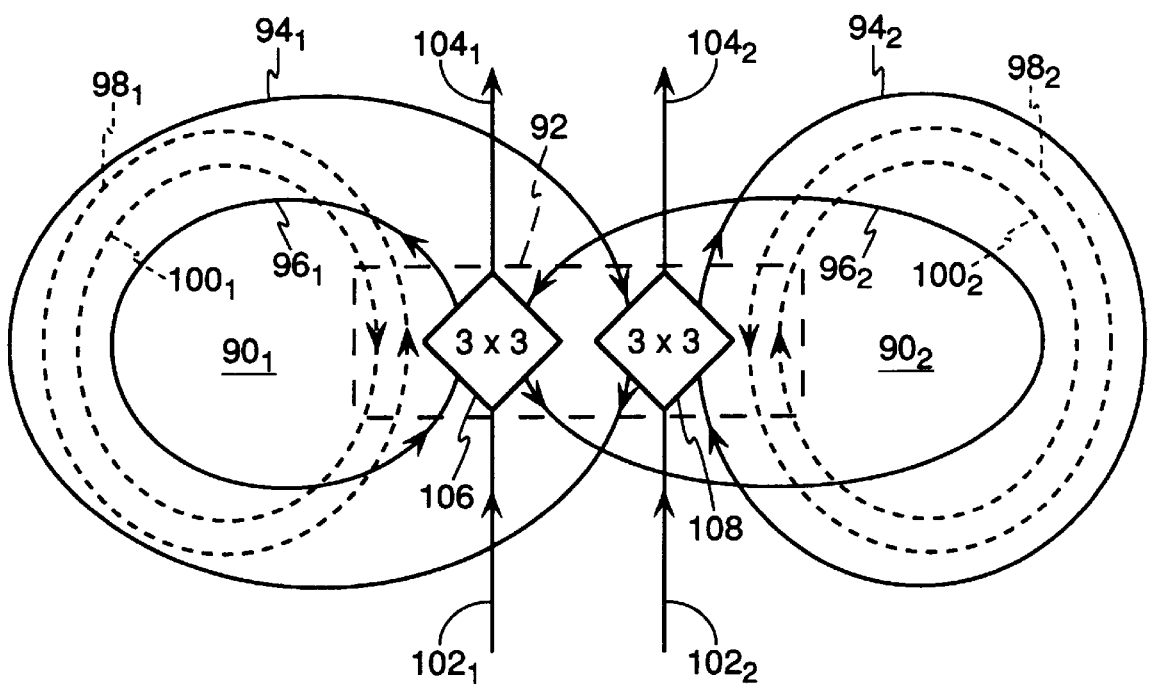
FIG. 13 is a network diagram of a simplified cross-connect for the network of FIG. 12 using 3×3 switches.

As illustrated, the B-SHR/4 cross-connect 92 for WDM needs a wavelength-selective 10×10 switch. However, almost complete functionality can be maintained if the cross-connect 92, as illustrated in FIG. 13, is implemented with two 3×3 switches 106, 108, each switching one working fiber $94_1$, $94_2$, $96_1$, $96_2$ in each of the two rings $90_1$, $90_2$ as well as one pair of add/drop fibers $102_1$, $102_2$, $104_1$, $104_2$. Just as for the APS embodiment of FIG. 9, the protection fibers $98_1$, $98_2$, $100_1$, $100_2$ are not directly switched through the cross-connect 92 and therefore bypass the 3×3 switches 106, 108. Although as illustrated the first 3×3 switch 106 inter-switches the counter-clockwise propagating fibers $96_1$, $96_2$ and the second 3×3 switch 106 inter-switches the clockwise propagating fibers $98_1$, $98_2$, clockwise and counter-clockwise signals in the two rings can just as easily be inter-switched. An unillustrated controller separately controls the switching states of the two 3×3 switches 106, 108.

The simplified inter-ring cross-connect of FIG. 13 suffers two constraints over the general 10×10 switch of FIG. 12. Signals traveling on one working fiber in the first ring cannot be selectively switched to one or the other of the working fibers of the other ring. The permanent fiber connections determine which two fibers can be inter-switched. This constraint does not limit the functionality of the cross-connect but implies that the second node cannot always use the shortest path to the desired destination node. This may be a minor concern for a small number of interconnected rings, and a large number of rings interconnected in a chain does not favor the 4-fiber architecture that provides a shortest path. Similarly, each 3×3 switch 106, 108 can drop (or add) only one signal at a given wavelength. Hence, the channel assignment protocol must assure that two channels of the same wavelength to be dropped at the cross-connect are directed to different 3×3 switches 106, 108.

Figure 14:
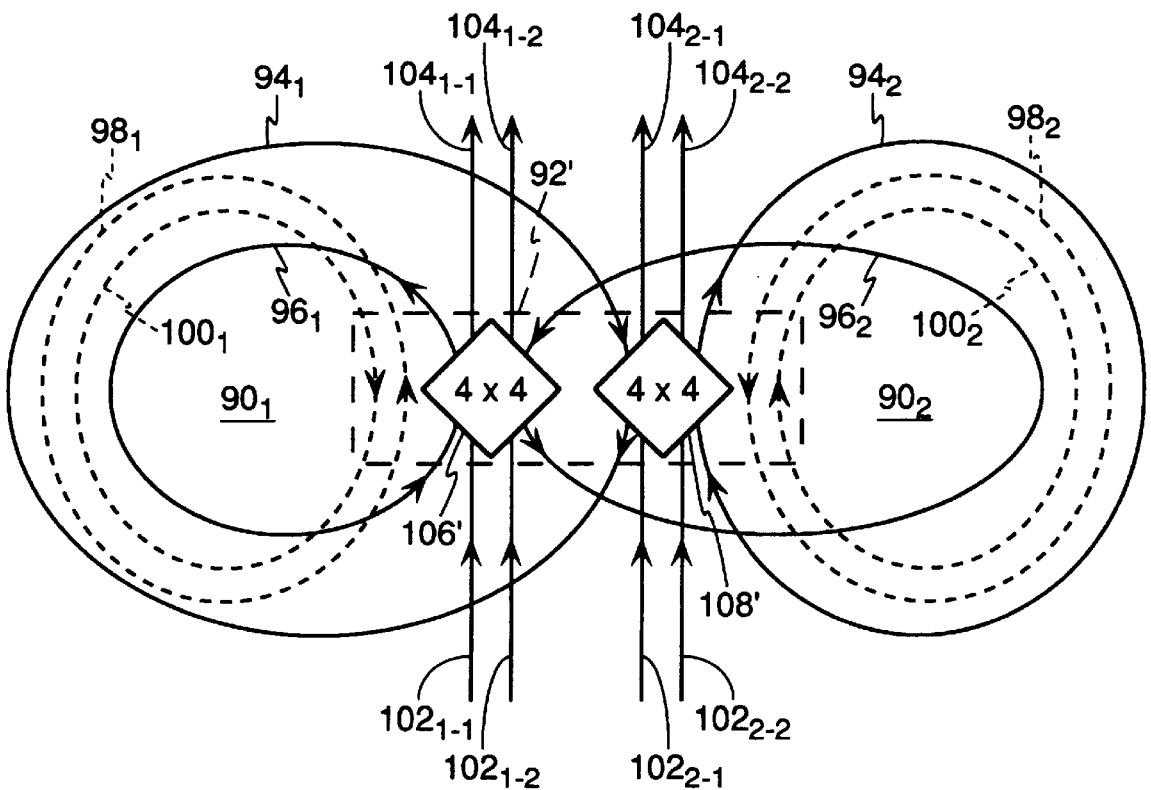
FIG. 14 is a network diagram of a simplified cross-connect similar to that of FIG. 13 but using 4×4 switches.

The corresponding non-conflicting architecture is shown in the network diagram illustrated in FIG. 14. A somewhat simplified cross-connect 92' includes two 4×4 switches 106', 108' having the previously described connections to the rings $90_1$, $90_2$. The number of add/drop lines is doubled so that at its add/drop ports the 4×4 switch 106' receives two add lines $102_{1-1}$, $102_{1-2}$ and transmits to two drop lines $104_{1-1}$, $104_{1-2}$, and the other 4×4 switch 108' receives two add lines $102_{2-1}$, $102_{2-2}$ and transmits to two drop lines $104_{2-1}$, $104_{2-2}$. Thereby, either ring $90_1$, $90_2$ can add or drop signals at the inter-ring node 92' without concern for the other ring.

Figure 15:
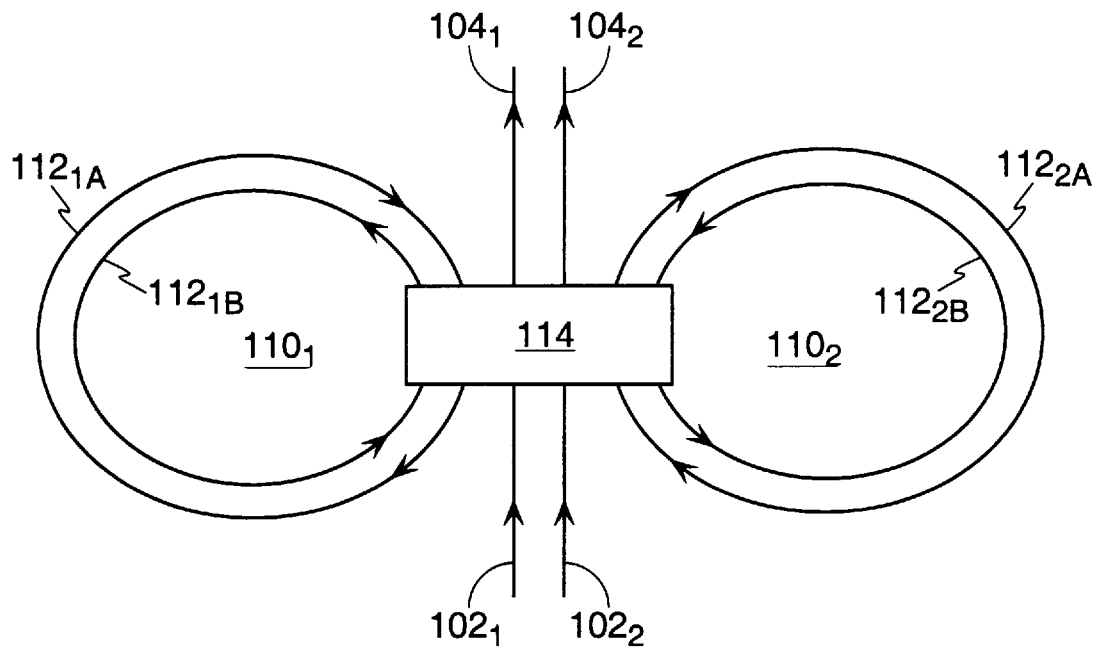
FIG. 15 is a network diagram of two interconnected bidirectional self-healing rings using two fibers apiece (B-SHR/2)

As illustrated in FIG. 15, a bidirectional path-protected self-healing ring can alternatively be implemented with only two fibers (B-SHR/2-PP). Each ring $110_1$, $110_2$ includes respectively fibers $112_{1A}$, $112_{2A}$ propagating in the clockwise direction and parallel fibers $112_{1B}$, $112_{2B}$ propagating in the counter-clockwise direction. The two rings $110_1$, $110_2$ are interconnected by a cross-connect 114, which also connects to two add fibers $102_1$, $102_2$ and two drop fibers $104_1$, $104_2$. Note that the networks of FIGS. 9 and 15, although topologically similar, provide different functionality. The former is unidirectional; the latter, bidirectional. In the bidirectional embodiment of FIG. 15, all the ring fibers $112_{1A}$, $112_{1B}$, $112_{2A}$, $112_{2B}$ are considered as working fibers since they carry data under normal conditions, and the data is not normally replicated on the counter-propagating fiber. However, each fiber is normally operated at only half of its capacity or less so that half of its capacity is held in reserve.

Figure 16:
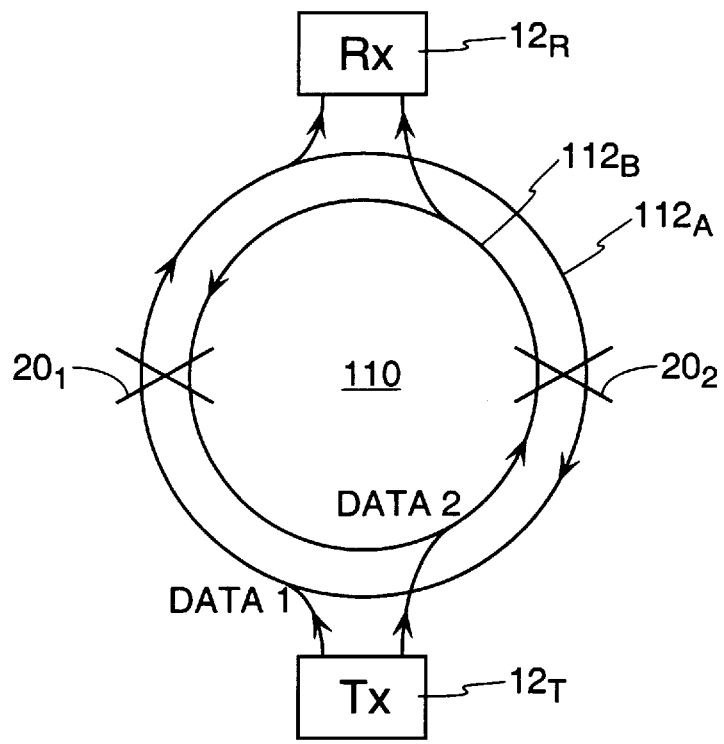
FIG. 16 is a simplified network diagram illustrating SONET time-slot interchanging for the B-SHR/2 network of FIG. 16.
Figure 17:
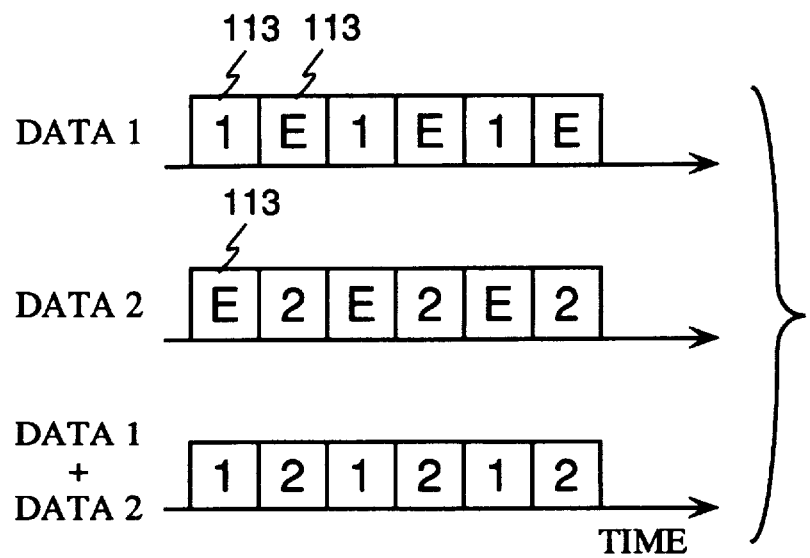
FIG. 17 is a timing diagram of SONET frames used in the network of FIG. 19.

Conventionally, the path protection afforded by this architecture has been accomplished by reducing capacity in SONET rings by normally using only half of the SONET time slots. As illustrated in the network diagram of FIG. 16, a transmitter $12_T$ transmits SONET signals to a receiver $12_R$ over a SONET ring 110 including counter-propagating fibers $112_A$ and $112_B$. It is understood that the transmitter $12_T$ and receiver $12_R$ are part of nodes 12 which are also capable of receiving and transmitting in the reverse direction. In normal operation, the transmitter $12_T$ transmits a first SONET frame DATA1, shown in FIG. 17 onto the clockwise fiber $112_A$ and a second SONET frame DATA2 onto the counter-clockwise fiber $112_B$. However, as illustrated in the framing structures of FIG. 17, in normal operation, the transmitter $12_T$ uses only half of the SONET data time slots 113, leaving alternating time slots E empty. SONET overhead slots are not illustrated in FIG. 17. In the event of a fiber break $20_1$ or $20_2$ or of intervening node failure, the receiver $12_R$ detects which fiber $112_A$, $112_B$ is inactive as far as its reception is concerned and notifies the transmitter $12_T$ on which fiber $112_A$, $112_B$ transmitting from the transmitter $12_T$ to the receiver $12_R$ the failure occurred, that is, whether it is failure $20_1$ or $20_2$. Of course, a double failure $20_1$ and $20_2$ would isolate the transmitter $12_T$ from the receiver $12_R$. The transmitter $12_T$, in response to determining which fiber has failed, combines the data from the two SONET frames into a single frame DATA1+DATA2 by using the empty slots E and transmits the combined frame DATA1+DATA2 onto the surviving fiber.

Figure 18:
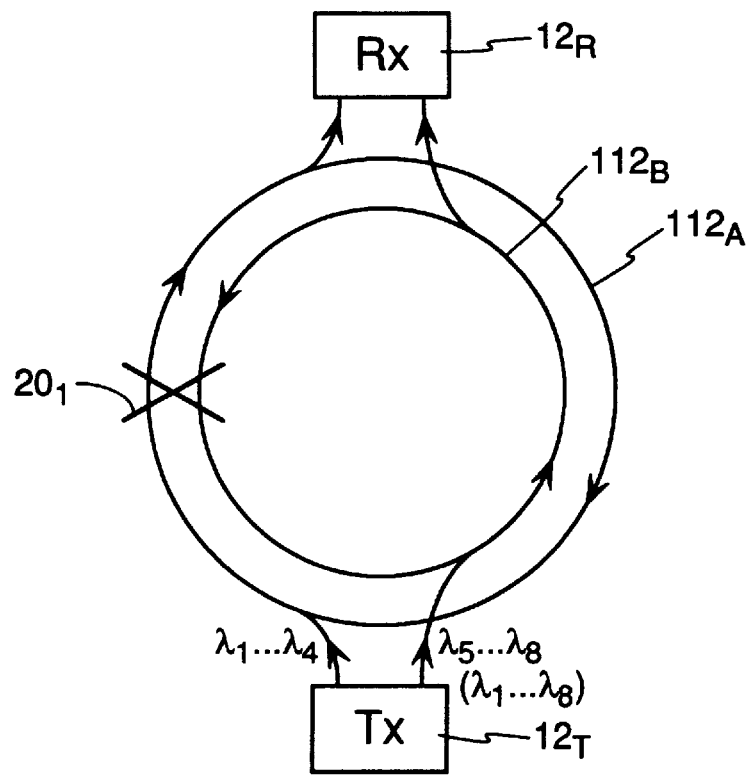
FIG. 18 is a simplified network diagram illustrating WDM wavelength interchanging for the B-SHR/2 network of FIG. 15.

However, in WDM networks the reduction in capacity can be more directly accomplished in the wavelength domain. For example, as illustrated in the network diagram of FIG. 18 for an 8-wavelength WDM network, the transmitter $12_T$ normally transmits only half the WDM wavelengths, for example, $1_1 \ldots 1_4$ onto the first fiber $112_A$ while it transmits the other four wavelengths $1_5 \ldots 1_8$ onto the other fiber $112_B$. However, in the case of a failure $20_1$ the receiver $12_R$ detects the failure in transmission at a given wavelength and notifies the transmitter $12_T$ of the failure's location, which is identified with the wavelength. In response, the transmitter $12_T$ begins transmitting all 8 WDM wavelengths $1_1 \ldots 1_8$ onto the surviving fiber $112_A$ that can be used for the link. This transfer can be accomplished in the optical domain without the necessity of demultiplexing to the electrical domain, as would be required to exchange time slots within the SONET frame.

The constraint is imposed that wavelengths passing from the failed ring to another ring may be placed on a fiber to which they are not normally assigned, and the receivers in the second ring must be notified of this reconfiguration. With this constraint, there is never a reason to switch a signal from a clockwise propagating fiber on one ring to a counter-clockwise propagating fiber on another ring since they are carrying signals of different wavelengths. Of course, the distinction does not involve the direction of rotation but involves the set of wavelengths being carried.

Figure 19:
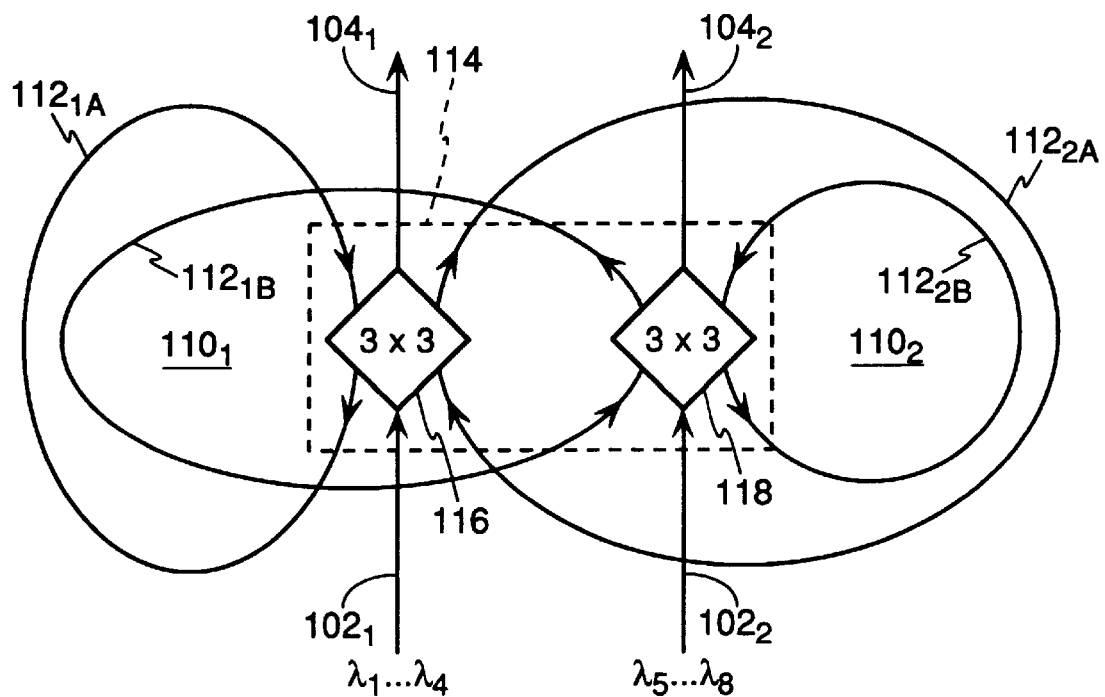
FIG. 19 is a network diagram of a simplified cross-connect for the network of FIG. 15 using 3×3 switches.

As a result of the limitation of interchange, the cross-connect 114 can be reduced from a 6×6 switch 114 most broadly apparent from FIG. 15 to a pair of 3×3 switches 116, 118 illustrated in FIG. 19. One 3×3 switch 116 is connected to the two clockwise propagating fibers $112_{1A}$, $112_{2A}$ carrying the four wavelengths $1_1 \ldots 1_4$ as well as to a pair of add/drop fibers $102_1$, $104_1$ while the other 3×3 switch 118 is connected to the two counter-clockwise propagating fibers $112_{1B}$, $112_{2B}$ carrying the other four wavelengths $1_5 \ldots 1_8$. This simplification has the advantage that the 3×3 switches 116, 118 in normal operation need switch only four wavelengths instead of eight although in case of failure each 3×3 switch 116, 118 needs to be able to switch all eight wavelengths if the inter-ring node (cross-connect) 114 is to dependably access all eight wavelengths. The simplification produces the usual restraint that two signals of the same wavelength cannot be added or dropped at the cross-connect 114.

An unillustrated controller, similar to the controller 72 of FIG. 7, controls the switching states of the two 3×3 switches 116, 118. In a WDM network, the two 3×3 switches 116, 118 are controlled to the same switching state insofar as a signal at a given WDM wavelength within a given ring $110_1$, $110_2$ is switched similarly by either switch 116, 118 regardless of which switch it transits. In normal operation, in each B-SHR/2 ring $110_1$, $110_2$ one fiber $112_{1A}$, $112_{1B}$ routes half the WDM signals to one 3×3 switch 116, and the other fiber $112_{1B}$, $112_{2B}$ routes the other half of the WDM signals to the other 3×3 switch 118. As a result, only half of the matching controller signals are significant at each 3×3 switch 116, 118. However, in case of a failure, all WDM wavelength signals are carried on one fiber and enter one of the 3×3 switches 116, 118, and all the required switch state control signals are already available at that 3×3 switch 116, 118.

Figure 20:
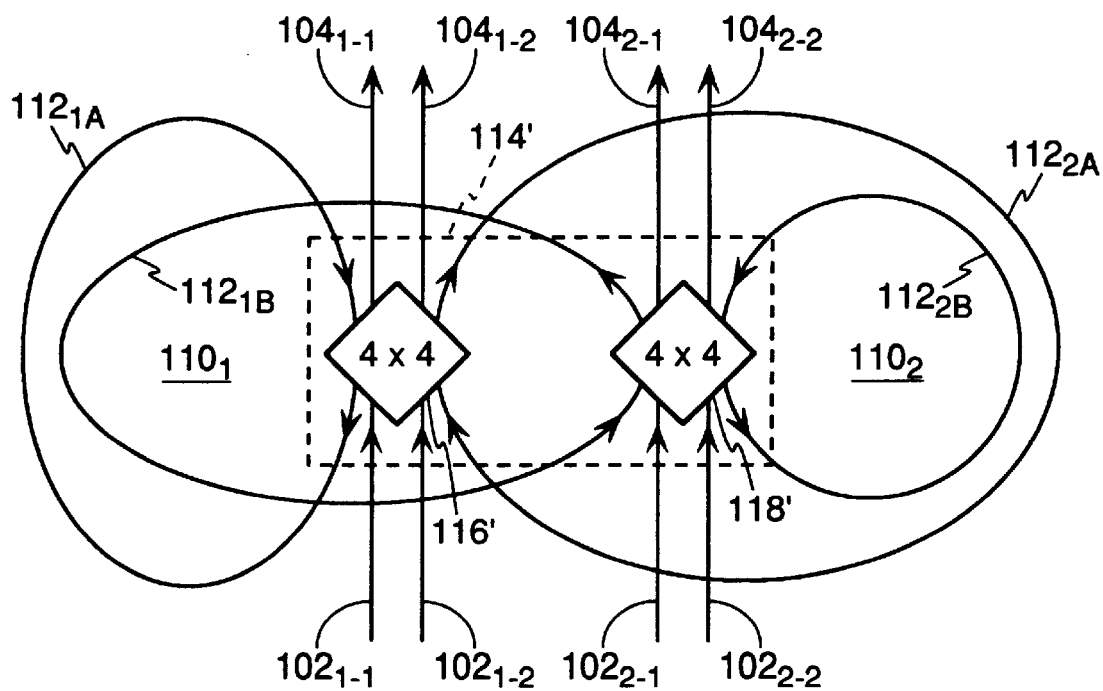
FIG. 20 is a network diagram of a simplified cross-connect similar to that of FIG. 19 but using 4×4 switches.

As for the other embodiments, contention at the inter-ring node 114 can be removed, as illustrated in the network diagram of FIG. 20, by a cross-connect 114' including two 4×4 switches 116', 118' having the previously described connections to the two rings $110_1$, $110_2$ but also having additional add/drop lines. Specifically, the first 4×4 switch 116' receives a pair of add lines $102_{1-1}$, $102_{1-2}$ and transmits on a pair of drop lines $104_{1-1}$, $104_{1-2}$. Similarly, the second 4×4 switch 118' receives a pair of add lines $102_{2-1}$, $102_{2-2}$ and transmits on a pair of drop lines $104_{2-1}$, $104_{2-2}$. If the ports connected to all eight add/drop lines can accommodate all the WDM wavelengths, wavelength contention at the inter-ring node 114' is removed, and the self-healing algorithm is simplified.

The component count for cross-connects (XC) and switches (Sw) is given in TABLE 1 for the different self-healing rings. This table is based on a single pair of add/drop lines in the cross-connects resulting in the use of 3×3 switches.

TABLE 1

| Ring Switch | U SHR/2 APS | U SHR/2 PP | B SHR/2 PP | B SHR/4 APS |
|---|---|---|---|---|
| 6 × 6 XC | 1 | 1 | 1 | — |
| 10 × 10 XC | — | — | — | 1 |
| 1 × 6 Sw | 12 W | 12 W | 12 W | — |
| 1 × 10 Sw | — | — | — | 20 W |
| 3 × 3 XC | 1 | 2 | 2 | 2 |
| 1 × 3 Sw | 6 W | 12 W | 12 W | 12 W |
| 2 × 2 Sw | 4 W | 8 W | 8 W | 8 W |
| Mux/Demux | 2 | 4 | 4 | 4 |
| 2 × 2 mλSw | 4 | 8 | 8 | 8 |

In this table, a cross-connect, XC, is assumed to be able to independently switch all W WDM wavelengths, while a simple switch, Sw, is assumed to not be able to differentiate the different wavelengths. For such simple switches additional multiplexers and demultiplexers are required. However, a multi-wavelength switch (m2Sw) is assumed to be able to independently switch the different WDM wavelengths. In the case in which the multi-wavelength switch is of the mechanically actuated type using different physical wavelength levels, multiplexers and demultiplexers are required.

If 4×4 switches are instead used to prevent the wavelength contention at the inter-ring node, the part count increases significantly, as is shown in following TABLE 2.

TABLE 2

| Ring Switch | U SHR/2 APS | U SHR/2 PP | B SHR/2 PP | B SHR/4 APS |
|---|---|---|---|---|
| 6 × 6 XC | 1 | 1 | 1 | — |
| 10 × 10 XC | — | — | — | 1 |
| 1 × 6 Sw | 12 W | 12 W | 12 W | — |
| 1 × 10 Sw | — | — | — | 20 W |
| 4 × 4 XC | 1 | 2 | 2 | 2 |
| 1 × 4 Sw | 8 W | 16 W | 16 W | 16 W |
| 2 × 2 Sw | 8 W | 16 W | 16 W | 16 W |
| Mux/Demux | 4 | 8 | 8 | 8 |
| 2 × 2 mλSw | 8 | 16 | 16 | 16 |

For example, rather than four 2×2 switches required to implement a 3×3 wide-sense non-blocking switch, eight 2×2 switches are required to implement a 4×4 wide-sense non-blocking switch. These numbers are multiplied by the number W of WDM wavelengths if the switches are not multi-wavelength. Of course, the additional add/drop lines require their own transmitters and receivers.

The architecture of interconnected survivable rings is often imposed upon an existing mesh network having a few large hubs at existing major central offices having fiber trunk lines extending in a number of directions. As a result, more than two rings may pass through the hub, and it may be advantageous to use a single cross-connect to switch between the three or more rings. The case of three path-protected, unidirectional self-healing rings (U-SHR/PP) will be developed, and this case will be generalized to K such rings.

The U-SHR/PP architecture impresses all signals upon both a working fiber and a protection fiber. The concepts applied to U-SHR/PP ring interconnects are easily extended to other types of rings.

Figure 21:
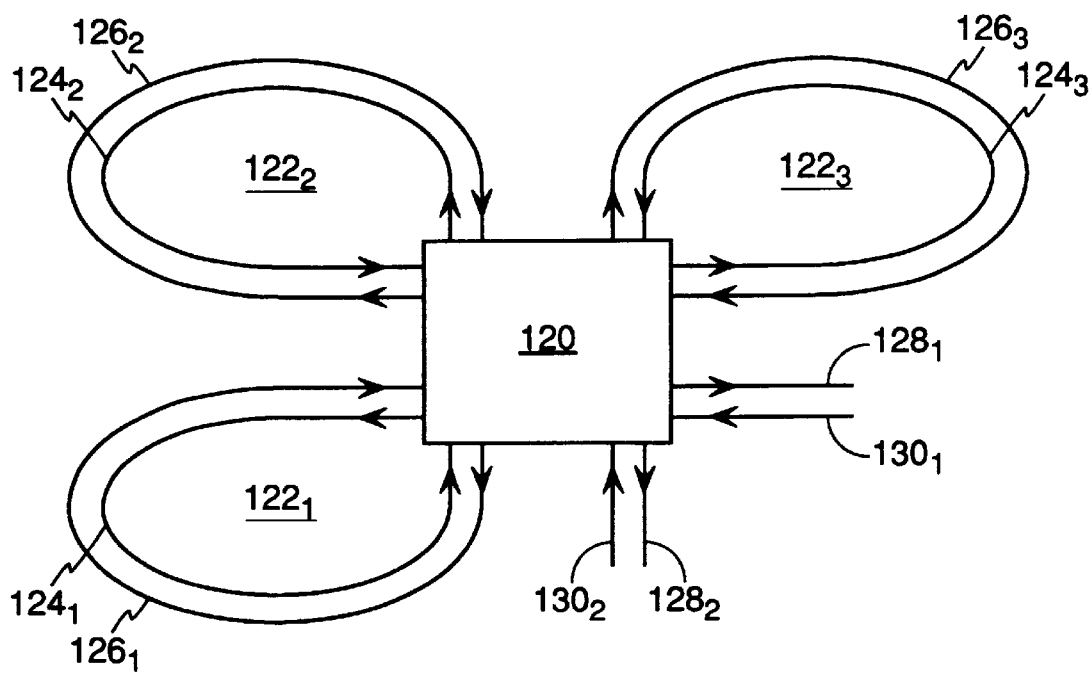
FIG. 21 is a network diagram of three interconnected unidirectional self-healing rings with path protection.
Figure 22:
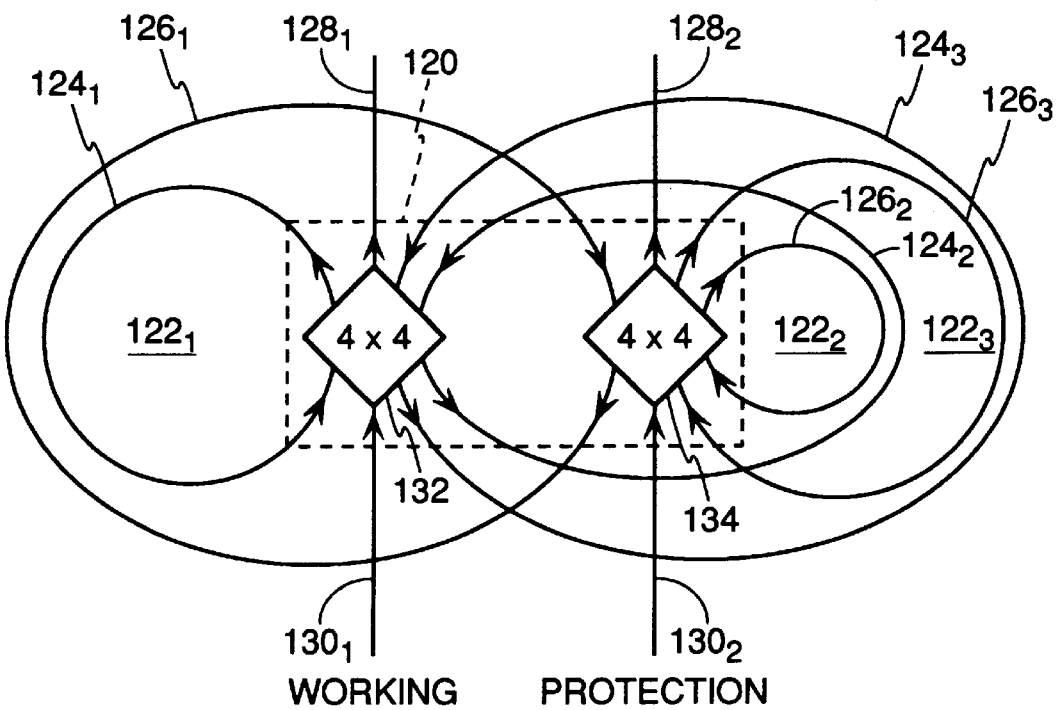
FIG. 22 is a network diagram of a simplified cross-connect for the network of FIG. 18.

As shown in FIG. 21, a single cross-connect 120 interconnects three rings $122_1$, $122_2$, $122_3$, each including a respective working fiber $124_1$, $124_2$, $124_3$ and a respective protection fiber $126_1$, $126_2$, $126_3$. Also, the selective connections extend to two drop/add clusters, each including a respective drop fiber $128_1$, $128_2$ and a respective add fiber $130_1$, $130_2$, which together provide an access node at the cross-connect 120. Two pairs of drop/adds are required since, in path-protected architectures, both the working and protection fiber need drop/adds. As illustrated, the cross-connect 120 requires an 8×8 wavelength-selective switch. For unidirectional path-protected rings, the cross-connect 120 can be simplified, as illustrated in FIG. 22, to two 4×4 switches 132, 134. The first 4×4 switch 132 is connected to both ends of all three working fibers $124_1$, $124_2$, $124_3$ as well as to a first pair of add/drop fibers $128_1$, $130_1$ while the second 4×4 switch 134 is connected to both ends of all three protection fibers $126_1$, $126_2$, $126_3$ as well as to a second pair of add/drop fibers $128_2$, $130_2$. Although for convenience the second ring $122_2$ is illustrated as being substantially included inside the third ring $122_3$, the rings are usually expected to extend over different geographical areas. In any case, the topology of the rings is not directly relevant to the invention, and they may exhibit nearly arbitrary topology.

It is seen that the self-healing interconnected ring network of FIG. 22 differs from that of FIG. 7 in that the 4×4 switches 132, 134 for interconnecting three rings replace the 3×3 switches 60, 62 for interconnecting two rings.

Figure 23:
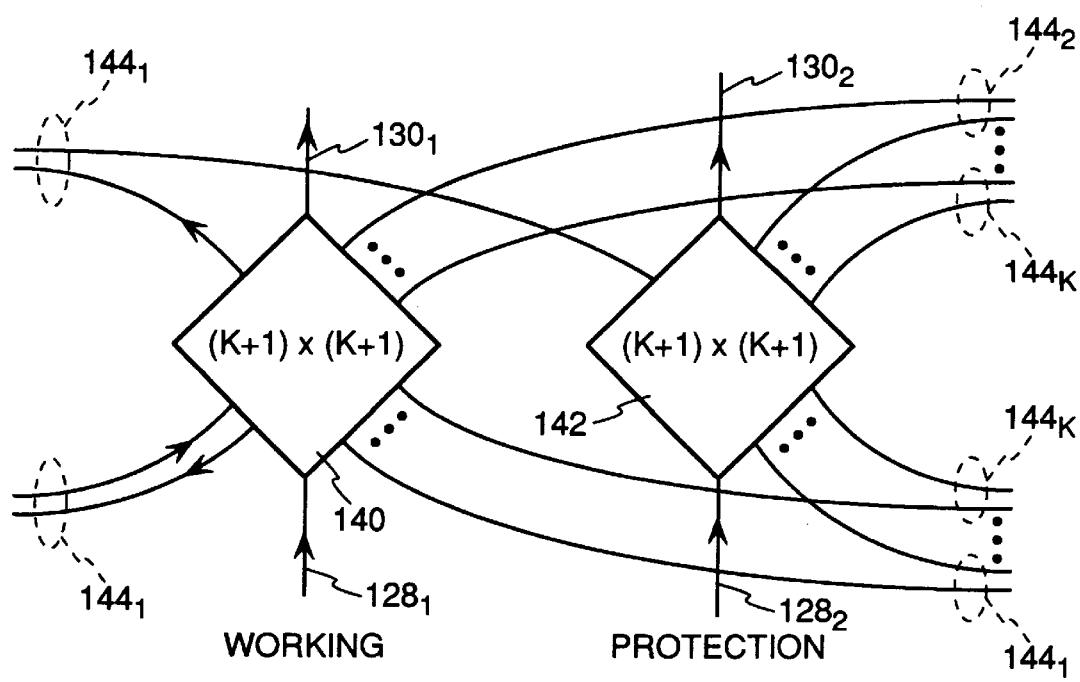
FIG. 23 is a network diagram of a simplified cross-connect for the generalized case of K interconnected unidirectional self-healing rings with path protection.

For interconnecting four U-SHR/PP rings, a 10×10 cross-connect is required. This can however be simplified to two 5×5 switches. In general, for interconnecting K WDM U-SHR/PP rings, a (2K+2)×(2K+2) cross-connect is required. However, as illustrated in FIG. 23, this can be simplified to two (K+1)×(K+1) switches 140, 142 interconnecting K rings, the rings comprising respective pairs $144_1$, $144_2$, ... $144_K$ of working and protection fibers. The first switch 140 is connected to the K working fibers and to the first pair of add/drop fibers $128_1$, $130_1$, and the second switch 142 is connected to the K protection fibers and to the second pair of add/drop fibers $128_2$, $130_2$.

The same generalized procedure can be applied to a cross-connect between more than two rings having configurations other than U-SHR/PP. In TABLE 3 are shown the type and number of cross-connects needed for the four network embodiments discussed above in detail.

TABLE 3

| Ring Type | U SHR/2 APS | U SHR/2 PP | B SHR/2 PP | B SHR/4 APS |
|---|---|---|---|---|
| Dual-Ring | one 3 × 3 | two 3 × 3 | two 3 × 3 | two 3 × 3 |
| Triple-Ring | one 4 × 4 | two 4 × 4 | two 4 × 4 | two 4 × 4 |
| K-Ring | one (K + 1) × (K + 1) | two (K + 1) × (K + 1) | two (K + 1) × (K + 1) | two (K + 1) × (K + 1) |

The higher-order cross-connects shown in FIGS. 21–24 and the parts count given in TABLE 3 are exposed to wavelength blocking for signals originating or terminating at the inter-ring node due to a paucity of add/drop lines. This contention can be removed by increasing the size of the switches 132, 134, 140, 142 to provide one add line and one drop line for each of the interconnected rings. For interconnecting three rings, one or two 6×6 switches are required to remove the blocking. Similarly, for interconnecting K rings one or two 2K×2K switches are required. Whether one or two switches are required depends upon the type of self-healing architecture, as summarized in TABLE 3.

The cross-connects between two self-healing WDM rings, as presented above, can be simplified to 3×3 multi-wavelength optical switches if some wavelength blocking at the inter-ring node is tolerated. One 3×3 optical switch can be implemented with three 1×3 switches and three 3×1 switches, for a total of six switches; but, this number is considered excessive, especially for a cost-sensitive design.

Figure 3:
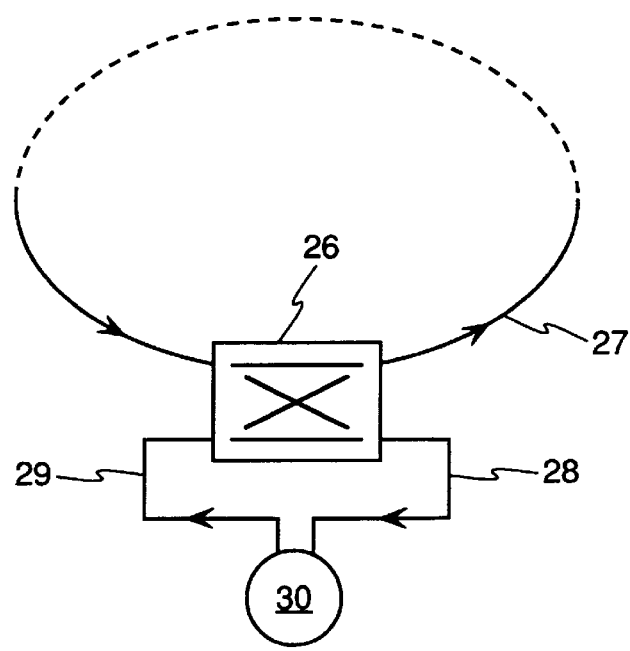
FIG. 3 is a network diagram of an add/drop multiplexer of the prior art attached to a communication ring.
Figure 4:
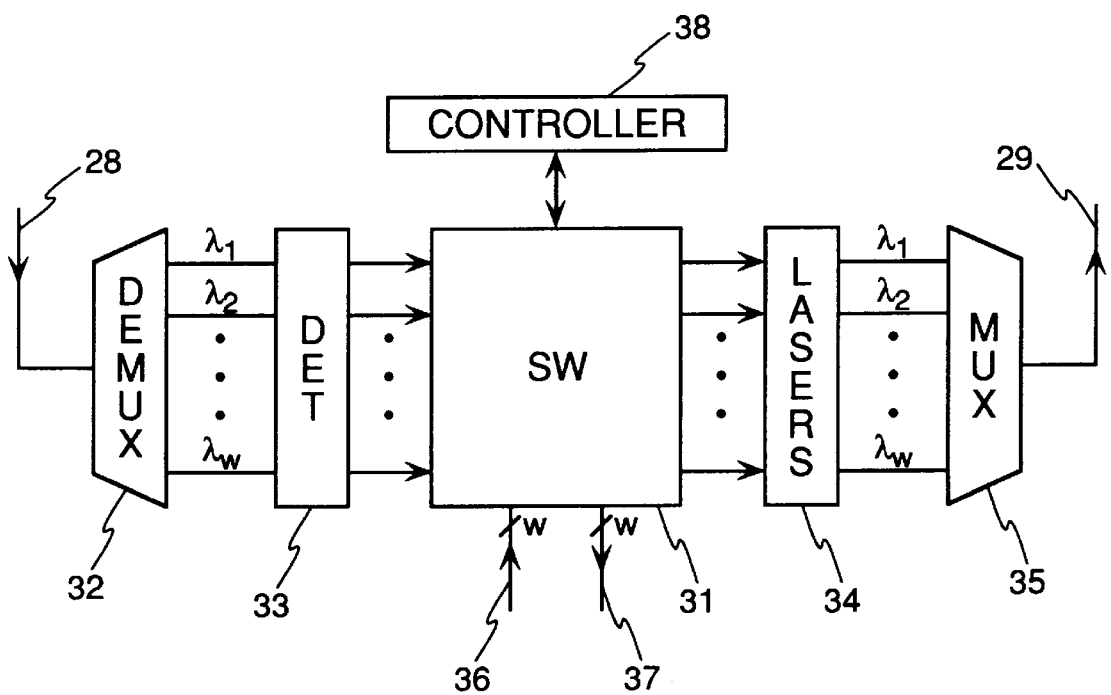
FIG. 4 is a diagram of an electronic switching system combined with an optical add/drop multiplexer.

A more fundamental structure is a 1×2 optical switch which can switch an input to one of two output dependent upon typically a non-linear interaction. This structure can sometimes be inverted to form a 2×1 switch, and four of these switches can then be combined into a 2×2 switch. Other technologies, such as acousto-optical tunable filters and liquid crystal switches readily form a 2×2 switch, such as switch 150 illustrated in FIG. 24, as a fundamental block, as has been explained with reference to FIG. 3. Such a 2×2 switch can be made at low cost, is easily implemented, and is more readily available.

Figure 24:
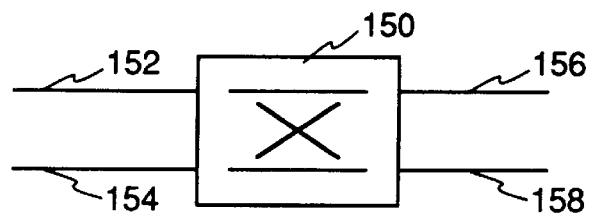
FIG. 24 is a schematic of a 2×2 switch.

The 2×2 switch 150, as shown in FIG. 24, has two optical inputs 152, 154 and two optical outputs 156, 158. The switch has two states. In the bar state, the upper optical input 152 is connected to the upper optical output 156, and the lower optical input 154 is connected to the lower optical output 158. In the cross state, the connections are reversed so that the upper optical input 152 is connected to the lower optical output 158 and the lower optical input 154 is connected to the upper optical output 156. In a well designed switch, the cross talk between selected channels is very small. The advantage of a multi-wavelength switch is that the switching is done in the optical domain, and the switch can independently and simultaneously switch the optical channels of different wavelength.

Figure 25:
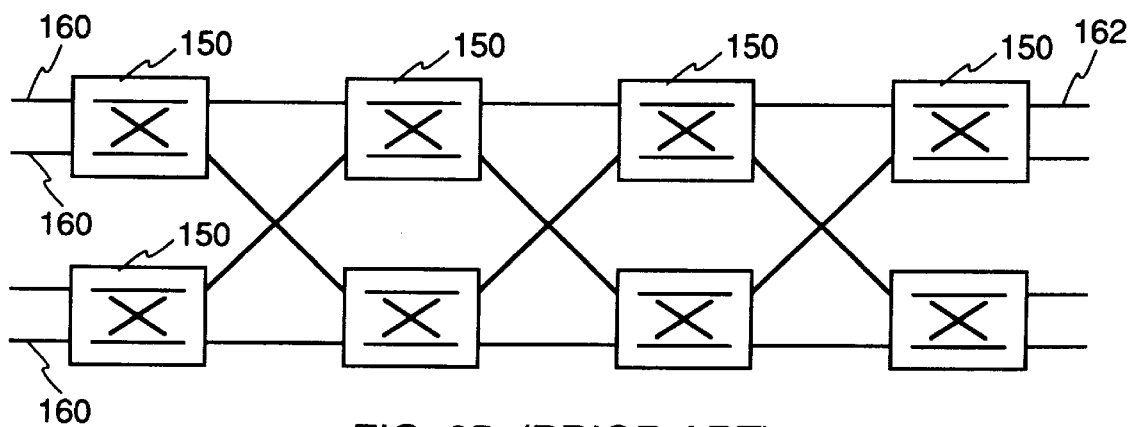
FIG. 25 is a schematic of a 4×4 switch that is wide-sense non-blocking.

Higher-order optical switches are often implemented as multiple stages of 2×2 switches. For example, a 4×4 optical switch is illustrated in FIG. 25 includes eight 2×2 switches 150 arranged in four stages and connecting four optical inputs 160 to four optical outputs 162 via the illustrated internal connections. Hinton in *An Introduction to Photonic Switching Fabrics*, (Plenum, 1993), pp. 90, 91 discloses that this network is a wide-sense non-blocking network, and he provides guidance for the routing algorithm through such a network. Particularly, the middle four 2×2 switches 150 should never be in the same state. See also, Bene' et al., "Wide-sense non-blocking networks, and some packing algorithms", *Electronics Letters*, vol. 17, 1981, p. 697. The so called Bene' network has one less stage of 2×2 switches but provides only a rearrangeably non-blocking switch, that is, one which allows any combination of any input being singly connected to any output, but a new path through the switch may require the existing paths to be rearranged.

The 4×4 wide-sense non-blocking network of FIG. 25 can be used for the 4×4 switches described for the non-contending cross-connects. It could also be used for implementing a 3×3 switch, but it would require eight 2×2 switches. It is preferred that a switching network be found for a 3×3 switch that requires fewer components.

There are six states in a 3×3 switch, as shown in TABLE 4. For a WDM optical switch, there are six such states for each wavelength.

TABLE 4

| STATE | INPUT | | |
|---|---|---|---|
| | 1 | 2 | 3 |
| | OUTPUT | | |
| a | 1 | 2 | 3 |
| b | 1 | 3 | 2 |
| c | 3 | 2 | 1 |
| d | 2 | 1 | 3 |
| e | 2 | 3 | 1 |
| f | 3 | 1 | 2 |

Figure 26:
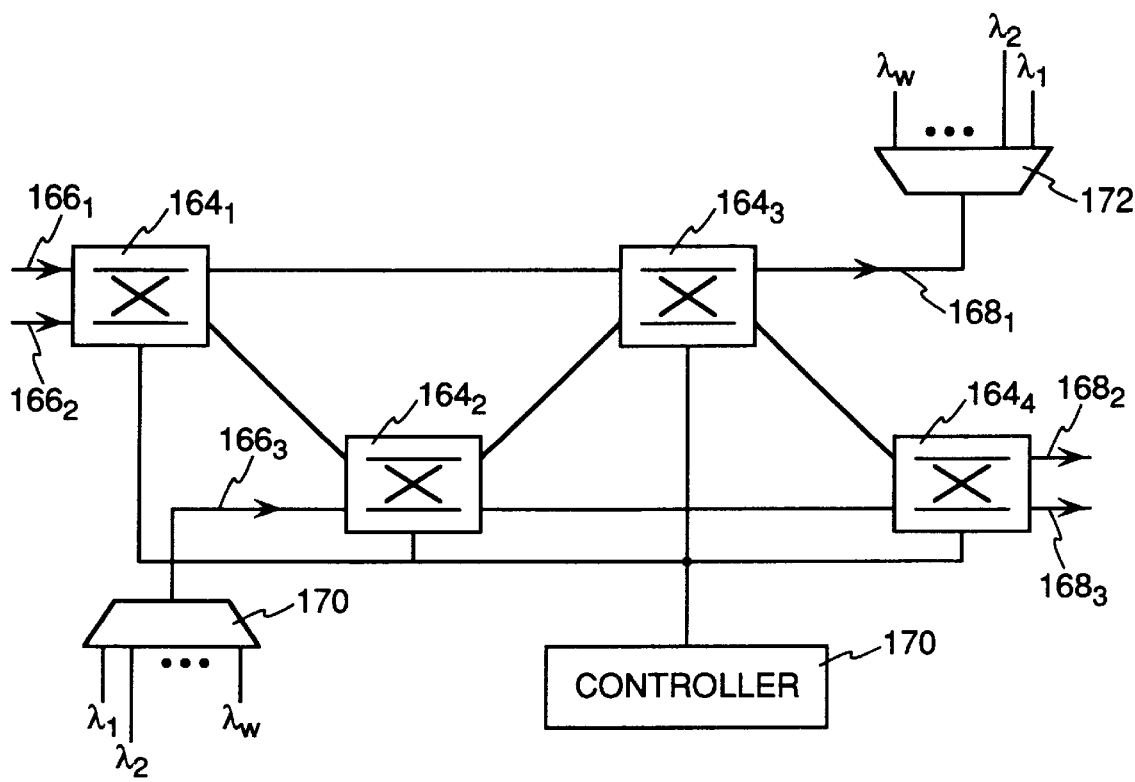
FIG. 26 is a schematic of a 3×3 wide-sense non-blocking switch using 2×2 switches, particularly applicable to a multi-wavelength switch.

A wide-sense non-blocking architecture for a 3×3 switch is shown in FIG. 26. A wide-sense non-blocking switch is a switch that can in all cases achieve an allowed transition from any one state to any other state without interrupting the traffic through the preexisting connections that themselves do not require changing. A clever algorithm may be required to accomplish wide-sense non-blocking. Such a wide-sense non-blocking 3×3 switch includes four 2×2 switches $164_1$, $164_2$, $164_3$, $164_4$ arranged in a staggered configuration to connect three inputs $166_1$, $166_2$, $166_3$ to three outputs $168_1$, $168_2$, $168_3$ with the illustrated internal connections. In a WDM network, the 2×2 switches $164_1$, $164_2$, $164_3$, $164_4$ are preferably all-optical switches, most preferably multi-wavelength switches. The subscripts on the inputs 166 and the outputs 168 in FIG. 26 can be used to numerically identify the input or output in TABLE 4. Similarly, the subscripts on the switches 164 can be used to provide the ordering of the switches in TABLE 5, to be introduced below. For example, the "A" state in TABLE 5 is listed as (0101). The first "zero" means that the first switch $164_1$ is in the BAR state. A "one" in the same position would mean it is in the CROSS state. In the context of the 3×3 switches 116, 118 of FIG. 19, the inputs $166_1$, $166_2$ and the outputs $168_2$, $168_3$ are connected to ring fibers $112_{1A}$, $112_{1B}$ or $112_{2A}$, $112_{2B}$ while the input $166_3$ is connected to an add wavelength multiplexer 170 and the output $168_1$ is connected to a drop wavelength demultiplexer 172. The add lines $102_1$, $102_2$ are then bundles of W fibers input to the multiplexer 170, and the drop lines $104_1$, $104_2$ are bundles of W fibers output from the demultiplexer 172.

One of the 2×2 switches 164 could be eliminated, but the 3×3 switch would then not be wide-sense non-blocking but only rearrangeably non-blocking in the sense that prior connections may need to be interrupted to be rearranged for a new permitted connection.

An algorithm will now be developed that shows how to select the four 2×2 switch states for the switching system of FIG. 26 to achieve a wide-sense non-blocking 3×3 switch state. Wide-sense non-blocking for a 3×3 switch requires that one input-to-output connection be maintained while the other two connections are changed or at least set up. The algorithm is executed by a controller 170 having control lines connected to the four 2×2 switches $164_1$, $164_2$, $164_3$, $164_4$.

From combinatorial mathematics or simply by inspecting TABLE 4, it is seen that each of the states a, b, . . . f can experience only three possible transitions to other states in which one connection is preserved. Each of the four switches 164 can assume one of two states. The bar state will be denoted by 0 while the cross state will be denoted by 1. The four 2×2 switches 164 as a whole can have sixteen state combinations. Twelve of these are selected, two for each of the six 3×3 switch states of TABLE 4, and these are labeled A, A', B, B', . . . F', and presented in TABLE 5.

TABLE 5

| A | (0101) | A' | (1010) |
|---|---|---|---|
| B | (1011) | B' | (0100) |
| C | (1110) | C' | (0111) |
| D | (1101) | D' | (0010) |
| E | (1111) | E' | (0110) |
| F | (1100) | F' | (0011) |

In this table, the rows represent the 3×3 switch states with the two allowed 2×2 switch combinations being listed in the second and fourth columns. The pairs of 3×3 switch states on each row represent different combinations of 2×2 switch states but produce equivalent outputs for given inputs of the 3×3 switch.

Figure 27:
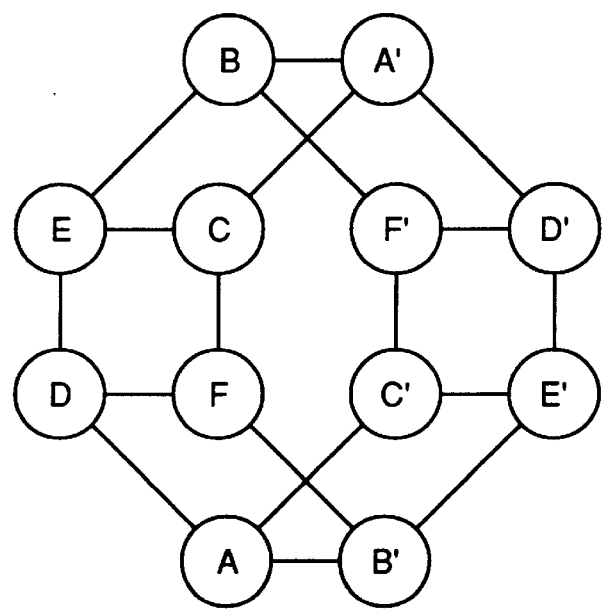
FIG. 27 is graphical illustration of an algorithm for unique transitions of the 3×3 switch of FIG. 26.

The required algorithm can be represented by the geometric structure of FIG. 27, which may be characterized as a two-level hexagon or hexagonal column. The switch state combinations A, A', B, B', . . . F' are identified with the vertices (corners) of the hexagonal column with the complementary combinations, e.g., A, A', being on opposed vertices on different planes (hexagonal faces). Permitted transitions are identified with single edges of the hexagonal column. For example, state combination A can transition to any of state combinations B', C', D, but to no other state combination. Any other transition would interrupt not only the connections being set up but also the connection that should be preserved.

Thus, to make a transition between any two of the 3×3 states of TABLE 4, the preexisting state combination of TABLE 5 must be known. For example, if the transition is between the states a, b of TABLE 4, it must be known whether the initial state combination of TABLE 5 is A or A' so that present configuration of all four 2×2 switches is identified. Assuming that the initial switch combination is A, then the permitted transition is to B', which requires the fourth 2×2 switch $164_4$ to toggle from the cross to the bar state while the first three switches $164_1$, $164_2$, $164_3$ remain respectively in the bar, cross, and bar states. Thereby, the connection between the first input $166_1$ and the first output $168_1$ is preserved without interruption. Although a transition from the state combination A to B would have produced the desired final connections between the inputs 166 and outputs 168, it would have momentarily interrupted the preserved connection as its path was reconfigured. If, on the other hand, the initial switch combination had been A', then the algorithm would have indicated a transition to the switch combination B. We believe that the states presented in TABLE 5 and the transition arrangement of FIG. 27 are unique for producing a wide-sense non-blocking transition although it is possible that equivalent combinations are available.

Although the above invention has been described in the context of optical network, many of its features can be applied to electrical networks.

The invention thus provides several important advantages in a communication network of interconnected self-healing rings, particularly optical fiber rings carrying WDM traffic. The complexity of the network can be substantially reduced by recognizing that many of the data paths through the interconnect do not need to be interconnected. As a result, the size of the interconnect can be made small enough as to be achievable with simple components. In particular, for two interconnected rings, one or two 3×3 switches may suffice. The invention further provides a wide-sense non-blocking 3×3 switch constructed from four 2×2 switches. Such simple switches are available as wavelength-selective optical cross-connects that can switch selected optical wavelengths in different directions. Thereby, the invention provides a simple switch that is usable with a WDM communication network in which conversion to the electrical domain is not required at the connection between two self-healing rings.

What is claimed is:

1. A cross-connect for interconnecting at least two unidirectional automatic protection switching self-healing communication rings, each ring comprising at least a first optical fiber propagating in a respective first direction and a second optical fiber propagating in a respective second direction opposite said respective first direction, said cross-connect comprising a switching element that interconnects said first optical fiber of said first communication ring to said first optical fiber of said second communication ring but wherein said switching element does not interconnect either of said first optical fibers of said first and second communication rings to either of said second optical fibers of said first and second communication rings, and wherein said switching element does not interconnect said second optical fibers of said first and second communication rings.

2. The cross-connect of claim 1, wherein said switching element is an optical switching element.

3. The cross-connect of claim 1, wherein each of said communication rings carries a plurality of wavelength-division multiplexed optical signals and wherein said switching element is an optical switching element and is wavelength selective between said wavelength-division multiplexed optical signals.

4. The cross-connect of claim 1 further allowing external access to each of said communication rings, wherein said switching element is a 3×3 switching element having one input and one output from said first optical fiber of said first communication ring, one input and one output from said first optical fiber of said second communication ring, and one input and one output for said external access.

5. The cross-connect of claim 1 further allowing external access to each of said communication rings, wherein said switching element is a 4×4 switching element having one input and one output from said first optical fiber of said first communication ring, one input and one output from said first optical fiber of said second communication ring, and two inputs and two outputs for said external access.

6. The cross-connect of claim 1 wherein said cross-connect interconnects K unidirectional automatic protection switching self-healing communication rings, said at least two communication rings being included among the K communication rings, and wherein said switching element is at least a (K+1)×(K+1) switching element that interconnects said K communication rings only through said first optical fiber of each K communication ring and that has at least one input and one output for external access to said K communication rings.

7. The cross-connect of claim 6 wherein said switching element is at least a (2K)×(2K) switching element that has at least K inputs and K outputs for external access to said K communication rings.

8. A cross-connect for interconnecting at least two unidirectional path-protected self-healing communication rings, each ring comprising at least a first optical fiber propagating in a respective first direction and a second optical fiber propagating in a respective second direction opposite said respective first direction, said cross-connect comprising:

a first switching element interconnecting said first optical fiber of said first communication ring to said first optical fiber of said second communication ring but wherein said first switching element does not interconnect either of said first optical fibers of said first and second communication rings to either of said second optical fibers of said first and second communication rings, and wherein said switching element does not interconnect said second optical fibers of said first and second communication rings; and a second switching element interconnecting said second optical fiber of said first communication ring to said second optical fiber of said second communication ring but wherein said second switching element does not interconnect either of said second optical fibers of said first and second communication rings to either of said first optical fibers of said first and second communication rings, and wherein said switching element does not interconnect said first optical fibers of said first and second communication rings.

9. The cross-connect of claim 8, wherein said first and second switching elements are optical switching elements.

10. The cross-connect of claim 8, wherein each of said communication rings carries a plurality of wavelength-division multiplexed optical signals and wherein said first and second switching elements are optical switching elements and are wavelength selective between said wavelength-division multiplexed optical signals.

11. The cross-connect of claim 8 further allowing external access to each of said communication rings, wherein said first switching element is a 3×3 switching element having one input and one output from said first optical fiber of said first communication ring, one input and one output from said first optical fiber of said second communication ring, and one input and one output for said external access; and wherein said second switching element is a 3×3 switching element having one input and one output from said second optical fiber of said first communication ring, one input and one output from said second optical fiber of said second communication ring, and one input and one output for said external access.

12. The cross-connect of claim 8 further allowing external access to each of said communication rings, wherein said first switching element is a 4×4 switching element having one input and one output from said first optical fiber of said first communication ring, one input and one output from said first optical fiber of said second communication ring, and two inputs and two outputs for said external access; and wherein said second switching element is a 4×4 switching element having one input and one output from said second optical fiber of said first communication ring, one input and one output from said second optical fiber of said second communication ring, and two inputs and two outputs for said external access.

13. The cross-connect of claim 8 wherein said cross-connect interconnects K unidirectional path-protected self-healing communication rings, said at least two communication rings being included among the K communication rings;

wherein said first switching element is at least a (K+1)×(K+1) switching element that interconnects said K communication rings only through said first optical fiber of each K communication ring and that has at least one input and one output for external access to said K communication rings; and wherein said second switching element is at least a (K+1)×(K+1) switching element that interconnects said K communication rings only through said second optical fiber of each K communication ring and that has at least one input and one output for external access to said K communication rings.

14. The cross-connect of claim 13 wherein said first and second switching elements are at least (2K)×(2K) switching elements wherein each of said (2K)×(2K) switching elements has at least K inputs and K outputs for external access to said K communication rings.

15. The cross-connect of claim 13 wherein said K communication rings interconnected by said cross-connect are bi-directional path-protected self-healing communication rings.

16. A cross-connect for interconnecting at least two bi-directional automatic protection switching self-healing communication rings, each ring comprising at least a first working optical fiber propagating in a first direction, a second working optical fiber propagating in a direction opposite to said first working optical fiber, a first protection optical fiber associated with said first working optical fiber and propagating in a direction opposite to said first working optical fiber, and a second protection optical fiber associated with said second working optical fiber and propagating in a direction opposite to said second working optical fiber, said cross-connect comprising:

a first switching element interconnecting said first working optical fiber of said first communication ring to said first working optical fiber of said second communication ring but wherein said first switching element does not interface with either of said second working optical fibers of said first and second communication rings, and wherein said first switching element does not interface with either of said first or second protection optical fibers of said first and second communication rings; and a second switching element interconnecting said second working optical fiber of said first communication ring to said second working optical fiber of said second communication ring but wherein said second switching element does not interface with either of said first working optical fibers of said first and second communication rings, and wherein said second switching element does not interface with either of said first or second protection optical fibers of said first and second communication rings.

17. The cross-connect of claim 16, wherein said first and second switching elements are optical switches.

18. The cross-connect of claim 16, wherein each of said communication rings carries a plurality of wavelength-division multiplexed optical signals and wherein said first and second switching elements are optical switching elements and are wavelength selective between said wavelength-division multiplexed optical signals.

19. The cross-connect of claim 16 further allowing external access to each of said communication rings, wherein said first switching element is a 3×3 switching element having one input and one output from said first working optical fiber of said first communication ring, one input and one output from said first working optical fiber of said second communication ring, and one input and one output for said external access; and wherein said second switching element is a 3×3 switching element having one input and one output from said second working optical fiber of said first communication ring, one input and one output from said second working optical fiber of said second communication ring, and one input and one output for said external access.

20. The cross-connect of claim 16 further allowing external access to each of said communication rings, wherein said switching element is a 4×4 switching element having one input and one output from said first working optical fiber of said first communication ring, one input and one output from said first working optical fiber of said second communication ring, and two inputs and two outputs for said external access; and wherein said second switching element is a 4×4 switching element having one input and one output from said second working optical fiber of said first communication ring, one input and one output from said second working optical fiber of said second communication ring, and two inputs and two outputs for said external access.

21. The cross-connect of claim 16 wherein said cross-connect interconnects K bi-directional automatic protection switching self-healing communication rings, said at least two communication rings being included among the K communication rings, wherein said first switching element is at least a (K+1)×(K+1) switching element that interconnects said K communication rings only through said first working optical fiber of each K communication ring and that has at least one input and one output for external access to said K communication rings; and wherein said second switching element is at least a (K+1)×(K+1) switching element that interconnects said K communication rings only through said second working optical fiber of each K communication ring and that has at least one input and one output for external access to said K communication rings.

22. The cross-connect of claim 21 wherein said first and second switching elements are at least (2K)×(2K) switching elements wherein each of said (2K)×(2K) switching elements has at least K inputs and K outputs for external access to said K communication rings.

23. A cross-connect for interconnecting at least two self-healing communication rings, each of said communication rings comprising at least one pair of counter-propagating fibers, said cross-connect comprising at least one switching element:

wherein said at least one switching element is connected to at most one fiber from each of said at least two communication rings and thereby said switching element does not provide full connectivity between all said pairs of fibers of said communication rings;

wherein said at least one switching element allows all nodes on said at least two communication rings to intercommunicate; and wherein said at least one switching element, upon at least one fault in at least one of said communication rings, allows said nodes on said at least two communication rings to continue intercommunicating.

24. A method for controlling interconnected self-healing communication rings, each of said communication rings comprising at least one pair of counter-propagating fibers, said communication rings being interconnected by at least one switching element wherein said at least one switching element is connected to at most a single fiber among said at least one pair of fibers of each of said communication rings and wherein said at least one switching element does not provide full connectivity between said pairs of fibers of said communication rings, said method comprising:

healing at least one fault in at least one of said communication rings, whereby said fault does not stop an operation of said at least one communication ring; and selectively connecting said fibers between said communication rings through said at least one switching element, wherein said selective connecting and said healing are performed independently and wherein said healing step does not affect a state of said at least one switching element imposed by said selectively connecting step.

25. A 3×3 switch, comprising:

a first 2×2 switch receiving first and second input lines of said 3×3 switch;

a second 2×2 switch receiving a third input line of said 3×3 switch and a first output of said first 2×2 switch;

a third 2×2 switch receiving a second output of said first 2×2 switch and a first output of said second 2×2 switch; and a fourth 2×2 switch receiving a first output of said third 2×2 switch and a second output of said second 2×2 switch;

wherein a first output line of said 3×3 switch is connected to a second output of said third 2×2 switch and second and third output lines of said 3×3 switch are connected to outputs of said fourth 2×2 switch.

26. The 3×3 switch of claim 25, wherein all of said 2×2 switches are optical switches.

27. The 3×3 switch of claim 26, wherein said optical switches are wavelength-selective switches.

28. The 3×3 switch of claim 25, further comprising control means controlling each of said 2×2 switches to one of two 2×2 switching states, combinations of said 2×2 switching states for said four 2×2 switches constituting 3×3 switching states, said control means including an algorithm in which 12 of said 3×3 switching states are arranged on vertices of a hexagonal column and said control means selects only transitions corresponding to edges of said hexagonal column.

29. The 3×3 switch of claim 28, wherein said hexagonal column includes two hexagonal faces extending in lateral directions and arranged along an axial direction;

wherein said 12 3×3 switching states includes pairs that produce equivalent connections through said 3×3 switch; and wherein each of said pairs is arranged at two vertices of said hexagonal column that are on different hexagonal faces and are opposed in said lateral directions.

30. The 3×3 switch of claim 29, wherein said 12 3×3 states are those of TABLE 5 and are arranged in the hexagonal column of FIG. 27.

31. A method of controlling four 2×2 switches interconnected to form a wide-sense non-blocking 3×3 switch, comprising the steps of:

selecting 12 combinations of states of said four 2×2 switches, pairs of said 12 combinations representing equivalent 3×3 switching states;

assigning said 12 combinations to vertices of a hexagonal column; and selecting transitions for said four 2×2 switches corresponding to edges of said hexagonal column.

32. The method of claim 31, wherein said 12 combinations are selected according to TABLE 5 and are arranged on the hexagonal column of FIG. 27.

* * * * *